United States Patent
Akiyoshi et al.

(10) Patent No.: US 8,982,240 B2
(45) Date of Patent: Mar. 17, 2015

(54) ELECTRONIC APPARATUS, POSITIONING DEVICE, INFORMATION PROCESSING METHOD, AND PROGRAM

(75) Inventors: Koichi Akiyoshi, Saitama (JP); Takuma Nishikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 724 days.

(21) Appl. No.: 12/926,809

(22) Filed: Dec. 10, 2010

(65) Prior Publication Data

US 2011/0164148 A1  Jul. 7, 2011

(30) Foreign Application Priority Data

Jan. 6, 2010  (JP) .................................. 2010-000842

(51) Int. Cl.
- *H04N 5/76* (2006.01)
- *G01S 19/27* (2010.01)
- *H04N 5/232* (2006.01)

(52) U.S. Cl.
CPC ..................................... *H04N 5/232* (2013.01)
USPC .................................. 348/231.99; 342/357.74

(58) Field of Classification Search
CPC .... H04N 5/772; H04N 2101/00; H04N 5/907
USPC ......... 348/231.2, 231.3, 231.99, 552, 207.99, 348/372, 222.1; 342/357.66, 357.74; 455/343.1, 343.2, 343.5; 396/301–303, 396/310

See application file for complete search history.

(56) References Cited

U.S. PATENT DOCUMENTS

| | | | |
|---|---|---|---|
| 6,995,792 B1 * | 2/2006 | Ogura | 348/231.99 |
| 7,333,054 B2 * | 2/2008 | Ueno et al. | 342/357.74 |
| 7,477,295 B2 * | 1/2009 | Tanaka | 348/231.3 |
| 7,539,411 B2 * | 5/2009 | Uchiyama et al. | 396/310 |
| 7,742,099 B2 * | 6/2010 | Ueno et al. | 348/372 |
| 7,843,506 B2 * | 11/2010 | Ueno et al. | 348/372 |
| 8,031,238 B2 * | 10/2011 | Uchiyama et al. | 348/231.3 |
| 8,098,324 B2 * | 1/2012 | Ueno et al. | 348/372 |
| 8,279,320 B2 * | 10/2012 | Ueno et al. | 348/333.05 |
| 8,305,479 B2 * | 11/2012 | Park | 348/333.13 |
| 2001/0010549 A1 * | 8/2001 | Miyake | 348/232 |
| 2004/0189813 A1 * | 9/2004 | Tanaka | 348/207.99 |
| 2007/0263981 A1 * | 11/2007 | Ueno et al. | 386/83 |
| 2008/0094499 A1 * | 4/2008 | Ueno et al. | 348/372 |
| 2008/0158391 A1 * | 7/2008 | Suzuki | 348/231.99 |
| 2009/0033768 A1 * | 2/2009 | Toyoda | 348/231.3 |
| 2009/0251558 A1 * | 10/2009 | Park | 348/222.1 |
| 2010/0026382 A1 * | 2/2010 | Higaki et al. | 327/544 |
| 2011/0050891 A1 * | 3/2011 | Ueno et al. | 348/135 |
| 2011/0085054 A1 * | 4/2011 | Choi et al. | 348/231.3 |
| 2011/0150452 A1 * | 6/2011 | Toda | 396/310 |
| 2011/0164148 A1 * | 7/2011 | Akiyoshi et al. | 348/231.99 |

(Continued)

FOREIGN PATENT DOCUMENTS

JP  2007-155577  6/2007

*Primary Examiner* — Aung S Moe
(74) *Attorney, Agent, or Firm* — Sony Corporation

(57) ABSTRACT

An electronic apparatus includes: a reception unit that receives positioning information necessary for a positioning process from the outside; a determination unit that determines whether or not a process on the basis of an operation input is a predetermined process that uses the positioning information in a case where the operation input is received from a user; and a control unit that performs control of an operation of the reception unit based on a result of the determination performed by the determination unit and a content of the operation of the reception unit.

16 Claims, 20 Drawing Sheets

(56) References Cited

U.S. PATENT DOCUMENTS

| | | | |
|---|---|---|---|
| 2011/0261227 A1* | 10/2011 | Higaki | 348/231.5 |
| 2012/0050553 A1* | 3/2012 | Nishimura | 348/208.5 |
| 2013/0194452 A1* | 8/2013 | Higaki | 348/231.5 |

* cited by examiner

FIG. 4

| POWER SUPPLYING LINE 202 | SIGNAL LINE 207 | SIGNAL LINE 204 | SIGNAL LINE 206 | POWER SWITCH 123 |
|---|---|---|---|---|
| *1 | L | H | H | ON |
| *1 | L | H | L | ON |
| *1 | L | L | H | ON |
| *1 | L | L | L | OFF |
| *2 | L | H | H | OFF |
| *2 | L | H | L | OFF |
| *2 | L | L | H | OFF |
| *2 | L | L | L | OFF |
| *1 | H | H | H | ON |
| *1 | H | H | L | OFF |
| *1 | H | L | H | ON |
| *1 | H | L | L | OFF |
| *2 | H | H | H | OFF |
| *2 | H | H | L | OFF |
| *2 | H | L | H | OFF |
| *2 | H | L | L | OFF |

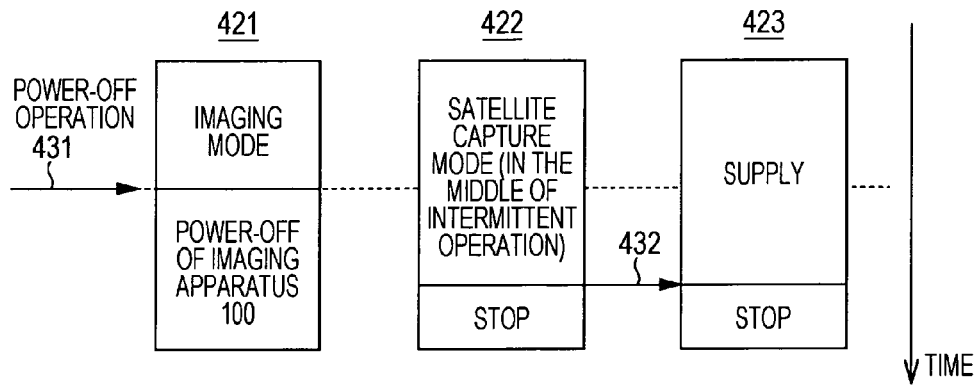
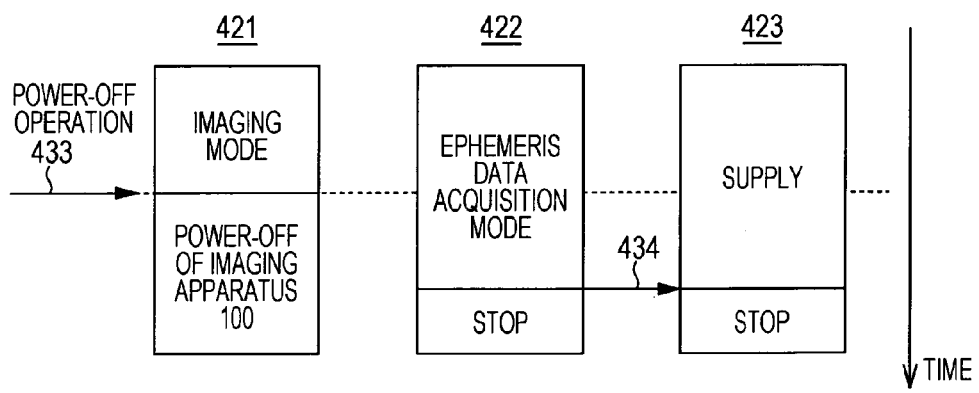
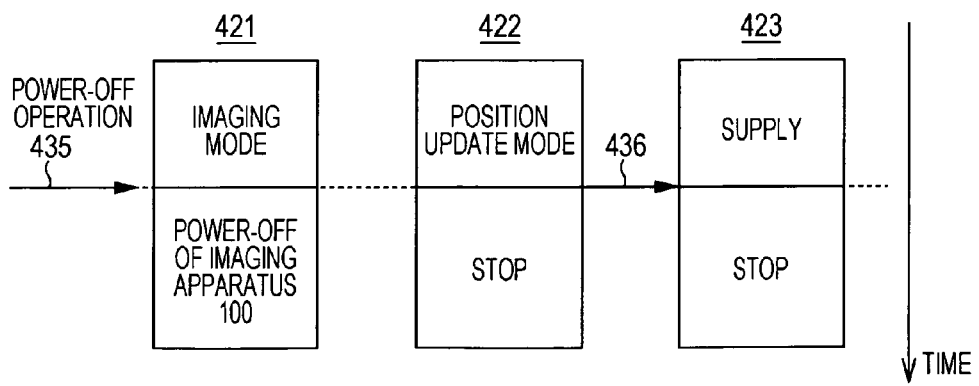

FIG. 12A

| POWER SUPPLYING LINE 202 | SIGNAL LINE 206 | SIGNAL LINE 641 | POWER SWITCH 123 |
|---|---|---|---|
| *1 | H | H | ON |
| *1 | H | L | ON |
| *1 | L | H | ON |
| *1 | L | L | OFF |
| *2 | H | H | OFF |
| *2 | H | L | OFF |
| *2 | L | H | OFF |
| *2 | L | L | OFF |

FIG. 12B

| SIGNAL LINE 644 | SIGNAL LINE 643 | SIGNAL LINE 642 |
|---|---|---|
| THERE IS OUTPUT | H | H |
| THERE IS OUTPUT | L | L |
| NO OUTPUT | H | L |
| NO OUTPUT | L | L |

ELECTRONIC APPARATUS, POSITIONING DEVICE, INFORMATION PROCESSING METHOD, AND PROGRAM

BACKGROUND OF THE INVENTION

1. Field of the Invention

The present invention relates to an electronic apparatus, and more particularly, to an electronic apparatus and a positioning device handling positioning information, a processing method in the electronic apparatus and the positioning device, and a program allowing a computer to perform the method.

2. Description of the Related Art

Recently, imaging apparatuses such as digital still cameras and digital video cameras (for example, camera-integrated recorders) that generate image data by imaging a subject such as a person or a landscape and recording the generated image data as an image content (image file) are widely used. In addition, imaging devices capable of recording the generated image data in association with the position at the time of imaging are proposed. For example, imaging apparatuses that have a GPS (Global Positioning System) device and record positional information acquired by the GPS device in association with generated image data are proposed.

In addition, recently, miniaturized imaging apparatuses that can be easily taken along by a user are widely used. Many of such portable imaging apparatuses are operated with battery driving, and it is important to lengthen the operating time thereof. Accordingly, even in acquisition of positional information using a GPS device, methods of suppressing the power consumption thereof are proposed.

Here, in a case where positional information is acquired by a GPS device, a time necessary for positioning differs in accordance with information (orbital information (ephemeris data), time information, and the like) maintained in the GPS device. For example, in a case where the GPS device maintains the ephemeris data and the time information, the GPS device can perform positioning by being started up through a hot start using the maintained information. On the other hand, in a case where the GPS device does not maintain the ephemeris data, the GPS device performs positioning by being started up through a cold start or a warm start using the maintained information. In other words, in a case where the ephemeris data is not maintained but the time information is maintained, the GPS device performs positioning by being started up through a warm start. In addition, in a case where any of the ephemeris data and the time information is not maintained, the GPS device performs positioning by being started up through a cold start.

While the hot start has relatively short time (about several seconds) that is necessary from the start-up to position measurement, the cold start and the warm start have relatively long time (30 seconds or longer) that is necessary from the start-up to position measurement. Accordingly, in a case where the positional information is desired to be acquired in a speedy manner after the start-up of the GPS device, it is important to maintain a state in which the device can be started up through the hot start. However, the effective time of the ephemeris data is four hours. Furthermore, since satellites that are seen form the same location change about every two hours, generally, the effective time of the ephemeris data is two hours.

Thus, for example, an information processing apparatus that monitors the photographing frequency and controls the supply of power to the GPS device based on the photographing frequency is proposed (for example, Japanese Unexamined Patent Application Publication No. 2007-155577 (FIG. 1)). This information processing apparatus, for example, intermittently supplies power to the GPS device in a case where the photographing frequency is less than a predetermined threshold value and continuously supplies power to the GPS device in a case where the photographing frequency is equal to or greater than the predetermined threshold value.

SUMMARY OF THE INVENTION

According to the above-described technology in related art, the positional information can be acquired in a speedy manner while consumption of a battery is suppressed by preventing unnecessary power consumption in the GPS device.

Here, for example, in a case where still images are photographed by using an imaging apparatus, it is supposed that power is repeatedly turned on/off for each photographing operation. For example, in a case where still image photographing is performed, it is supposed that the power of the imaging apparatus is turned on, one or a plurality of still images is photographed at a desired place, and the power of the imaging apparatus is turned off immediately after the photographing operation. Accordingly, for example, in a case where there is a tour in which a plurality of touring places are visited on one day, it is supposed that still-image photographing is continuously performed, and the power on/off operation of the imaging apparatus is repeatedly performed.

However, according to the above-described technology in related art, in a case where the photographing frequency is less than the predetermined threshold value, the GPS device performs an intermittent positioning operation regardless of the On/Off state of the power of the imaging apparatus until the user photographing operation is determined not to be continued. Accordingly, even in a case where the power of the imaging apparatus is in the OFF state, the GPS device performs an intermittent positioning operation. In this case, although the power of the imaging apparatus is in the OFF state, power is consumed due to the intermittent positioning operation of the GPS device. In addition, even in a case where the power of the imaging apparatus is in the ON state, a case where a positioning operation is not performed by the GPS device may be supposed. Thus, it is important to decrease the power consumption in a case where the GPS device is not used such as a case where the power of the imaging apparatus is in the OFF state and to appropriately perform a positioning operation when the imaging apparatus is used.

It is desirable to appropriately performing a positioning operation while decreasing the power consumption.

According to an embodiment of the present invention, there are provided an electronic apparatus including: a reception unit that receives positioning information necessary for a positioning process from the outside; a determination unit that determines whether or not a process on the basis of an operation input is a predetermined process that uses the positioning information in a case where the operation input is received from a user; and a control unit that performs control of an operation of the reception unit based on a result of the determination performed by the determination unit and a content of the operation of the reception unit, a method of processing information thereof, and a program allowing a computer to perform the method. Accordingly, an advantage that whether or not a process on the basis of an operation input received from a user operation is the predetermined process is determined, and the operation of the reception unit is controlled based on the result of the determination and the content of the operation of the reception unit is acquired.

In the above-described electronic apparatus, it may be configured that, in a case where the process on the basis of the operation input is determined to be the predetermined process by the determination unit, the control unit performs control so as to operate the reception unit, and, in a case where the process on the basis of the operation input is determined not to be the predetermined process by the determination unit, the control unit performs control so as to operate the reception unit in a first mode until the predetermined operation is completed and control so as to control the operation of the reception unit to transit to a second mode having power consumption lower than the first mode after completion of the predetermined operation in a case where the reception unit is in the first mode in which the predetermined operation is performed and performs control so as to transit the reception unit to the second mode in a case where the reception unit is not in the first mode. In such a case, an advantage that, in a case where the process on the basis of the operation input is determined to be the predetermined process, the reception unit is controlled so as to be operated, and, in a case where the process on the basis of the operation input is determined not to be the predetermined process, the reception unit is controlled so as to be operated in a first mode until the predetermined operation is completed and so as to transit to a second mode after completion of the predetermined operation in a case where the reception unit is in the first, and the reception unit is controlled so as to transit to the second mode in a case where the reception unit is not in the first mode is acquired.

In addition, in the above-described electronic apparatus, the control unit may perform control so as to operate the reception unit in a case where the process on the basis of the operation input is determined to be the predetermined process by the determination unit and perform control so as to stop the operation of the reception unit based on the content of the operation of the reception unit in a case where the process on the basis of the operation input is determined not to be the predetermined process. In such a case, an advantage that the reception unit is controlled to be operated in a case where the process on the basis of the operation input is determined to be the predetermined process, and the operation of the reception unit is controlled to be stopped based on the content of the operation of the reception unit in a case where the process on the basis of the operation input is determined not to be the predetermined process is acquired.

In addition, in the above-described electronic apparatus, in a case where the process on the basis of the operation input is determined not to be the predetermined process by the determination unit, the control unit may perform control so as to operate the reception unit until a predetermined operation is completed and control so as to stop the operation of the reception unit after completion of the predetermined operation in a case where the reception unit performs the predetermined operation and perform control so as to stop the operation of the reception unit in a case where the reception unit does not perform the predetermined operation. In such a case, an advantage that, in a case where the process on the basis of the operation input is determined not to be the predetermined process, the reception unit is controlled to be operated until a predetermined operation is completed and the operation of the reception unit is stopped after completion of the predetermined operation in a case where the reception unit performs the predetermined operation and the operation of the reception unit is controlled to be stopped in a case where the reception unit does not perform the predetermined operation is acquired.

In addition, in the above-described electronic apparatus, it may be configured that the reception unit includes a GPS system that acquires the positioning information using a GPS, and the predetermined operation is any one of an operation used for acquiring ephemeris data and an operation used for capturing a GPS satellite. In such a case, an advantage that the operation of the GPS system is controlled based on the content of the operation of the GPS system is acquired.

In addition, in the above-described electronic apparatus, it may be configured that the reception unit is set to any operation mode of an ephemeris data acquiring mode in which an operation used for acquiring ephemeris data is performed, a satellite capture mode in which an operation used for capturing a GPS satellite is intermittently performed at a predetermined interval, and a position update mode in which an operation used for updating positional information that is calculated based on the positioning information is intermittently performed at a predetermined interval, and the control unit, in a case where the process on the basis of the operation input is determined not to be the predetermined process by the determination unit, performs control so as to stop the operation of the reception unit in a case where the position update mode is set, and performs control so as to operate the reception unit until the predetermined operation relating to the set mode is completed and control so as to stop the operation of the reception unit after completion of the predetermined operation in a case where the ephemeris data acquiring mode or the satellite capture mode is set. In such a case, there is an advantage that, in a case where the process on the basis of the operation input is determined not to be the predetermined process, the operation of the reception unit is controlled to be stopped in a case where the position update mode is set, and the reception unit is controlled to be operated until the predetermined operation relating to the set mode is completed and the operation of the reception unit is controlled to be stopped after completion of the predetermined operation in a case where the ephemeris data acquiring mode or the satellite capture mode is set.

In addition, in the above-described electronic apparatus, in a case where the process on the basis of the operation input is determined not to be the predetermined process by the determination unit and the satellite capture mode is set, the control unit may perform control so as to operate the reception unit until a satellite capturing operation is completed and control so as to stop the operation of the reception unit after completion of the satellite capturing operation in a case where the operation used for capturing the GPS satellite is performed and perform control so as to stop the operation of the reception unit in a case where the operation used for capturing the GPS satellite is not performed. In such a case, there is an advantage that, in a case where the process on the basis of the operation input is determined not to be the predetermined process and the satellite capture mode is set, the reception unit is controlled to be operated until satellite capturing operation is completed and the operation of the reception unit is controlled to be stopped after completion of the satellite capturing operation in a case where the satellite capturing operation is performed, and the operation of the reception unit is controlled to be stopped in a case where the satellite capturing operation is not performed.

In addition, in the above-described electronic apparatus, in a case where the process on the basis of the operation input is determined not to be the predetermined process by the determination unit and the satellite and the satellite capture mode is set, the control unit may perform control so as to allow the reception unit to transit to the ephemeris data acquiring mode and operate until the operation used for acquiring the ephemeris data is completed and control so as to stop the operation of the reception unit after completion of the acquisition operation in a case where criteria for acquisition of the ephemeris data are satisfied when the operation used for capturing the GPS satellite is completed. In such a case, there is an advantage that, in a case where the process on the basis of the operation input is determined not to be the predetermined process and the satellite capture mode is set, the reception unit is controlled to transit to the ephemeris data acquiring mode and operate until the operation used for acquiring the ephemeris data is completed and the operation of the reception unit is controlled to be stopped after completion of the acquisition operation in a case where criteria for acquisition of the ephemeris data are satisfied at the time of completion of the satellite capturing operation.

In addition, the above-described electronic apparatus may further include an imaging unit that generates image data by imaging a subject, wherein the predetermined process is a process of recording the image data generated by the imaging unit in association with the positional information that is calculated based on the positioning information acquired by the reception unit. In such a case, there is an advantage that the supply of power to the reception unit is controlled based on whether the process on the basis of the operation input is a process of recording the image data generated by the imaging unit in association with the positional information that is calculated by the reception unit.

In addition, the above-described electronic apparatus may further include an operation reception unit that receives a switching operation switching from a photographing mode used for performing the predetermined process to another mode used for performing a process other than the predetermined process or a switching operation switching from the another mode to the photographing mode as the operation input, wherein the determination unit determines the process on the basis of the operation input not to be the predetermined process in a case where the switching operation switching from the photographing mode to the another mode is received as the operation input and determines the process on the basis of the operation input to be the predetermined process in a case where the switching operation switching from the another mode to the photographing mode is received as the operation input. In such a case, there is an advantage that the process on the basis of the operation input is determined not to be the predetermined process in a case where the switching operation switching from the photographing mode to the another mode is received, and the process on the basis of the operation input is determined to be the predetermined process in a case where the switching operation switching from the another mode to the photographing mode is received.

In addition, the above-described electronic apparatus may further include an operation reception unit that receives a power-off operation that turns the power of the electronic apparatus off as the operation input, wherein the determination unit, in a case where the power-off operation is received as the operation input, determines the process on the basis of the operation input not to be the predetermined process. In such a case, there is an advantage that, in a case where the power-off operation is received, the process on the basis of the operation input is determined not to be the predetermined process.

In addition, the above-described electronic apparatus may further include: a power supply unit that supplies main power to the reception unit through a power supply line; and at least one switching unit of a switching unit that switches between ON/OFF of the power supply line and a switching unit that switches between ON/Standby in accordance with a control signal line, wherein the control unit performs control of the operation of the reception unit by controlling the switching unit. In such a case, there is an advantage that the operation of the reception unit is controlled by controlling the switching unit.

According to another embodiment of the present invention, there are provided an electronic apparatus including: a reception unit that receives positioning information necessary for a positioning process from the outside; a determination unit that, in a case where a state of the electronic apparatus changes, determines whether or not a process performed in a state after the change is a predetermined process that uses the positioning information; and a control unit that performs control of an operation of the reception unit based on a result of the determination performed by the determination unit and a content of the operation of the reception unit, a method of processing information thereof, and a program allowing a computer to perform the method. Accordingly, there is an advantage that, in a case where the state of the electronic apparatus changes, whether or not a process performed in the state after the change is the predetermined process is determined, and the operation of the reception unit is controlled based on the result of the determination and the content of the operation of the reception unit.

In the above-described electronic apparatus, it may be configured that the determination unit, in a case where the state after the change is a standby state, determines the process performed in the state after the change not to be the predetermined process, and the control unit performs control so as to operate the reception unit in a case where the process performed in the state after the change is determined to be the predetermined process by the determination unit and performs control so as to stop the operation of the reception unit based on the content of the operation of the reception unit in a case where the process performed in the state after the change is determined not to be the predetermined process by the determination unit. In such a case, there is an advantage that, in a case where the state after the change is a waiting state (for example, a standby state), the process performed in the state after the change is determined not to be the predetermined process, and the reception unit is controlled to be operated in a case where the process performed in the state after the change is determined to be the predetermined process, and the operation of the reception unit is controlled to be stopped based on the content of the operation of the reception unit in a case where the process performed in the state after the change is determined not to be the predetermined process.

According to a further another embodiment of the present invention, there are provided an positioning device including: a reception unit that receives positioning information necessary for a positioning process from the outside; an acquisition unit that, in a case where an operation input from a user is received, acquires predetermined information representing whether or not a process on the basis of the operation input is a predetermined process that uses the positioning information; and a control unit that controls whether or not an operation is performed based on the acquired predetermined information and the content of the operation at the time of acquisition of the predetermined information, a method of processing information thereof, and a program allowing a computer to perform the method. Accordingly, there is an advantage that predetermined information (for example, the result of the determination) representing whether or not the process on the basis of the operation input received in accordance with a user operation is the predetermined process is acquired, and whether or not the operation is performed is controlled based on the predetermined information and the content of the operation at the time of acquisition of the information.

According to an embodiment of the present invention, superior advantages that power consumption is reduced, and an appropriate positioning operation can be performed can be acquired.

BRIEF DESCRIPTION OF THE DRAWINGS

FIG. 4 is a diagram schematically representing the control content of a power control logic circuit according to the first embodiment of the present invention.

FIGS. 7A to 7C are sequence charts showing cases where the operation of a positioning unit is controlled by an operation control unit according to the first embodiment of the present invention.

FIGS. 12A and 12B are diagrams schematically representing the control content of a power control logic circuit according to the second embodiment of the present invention.

DESCRIPTION OF THE PREFERRED EMBODIMENTS

Figure 1:
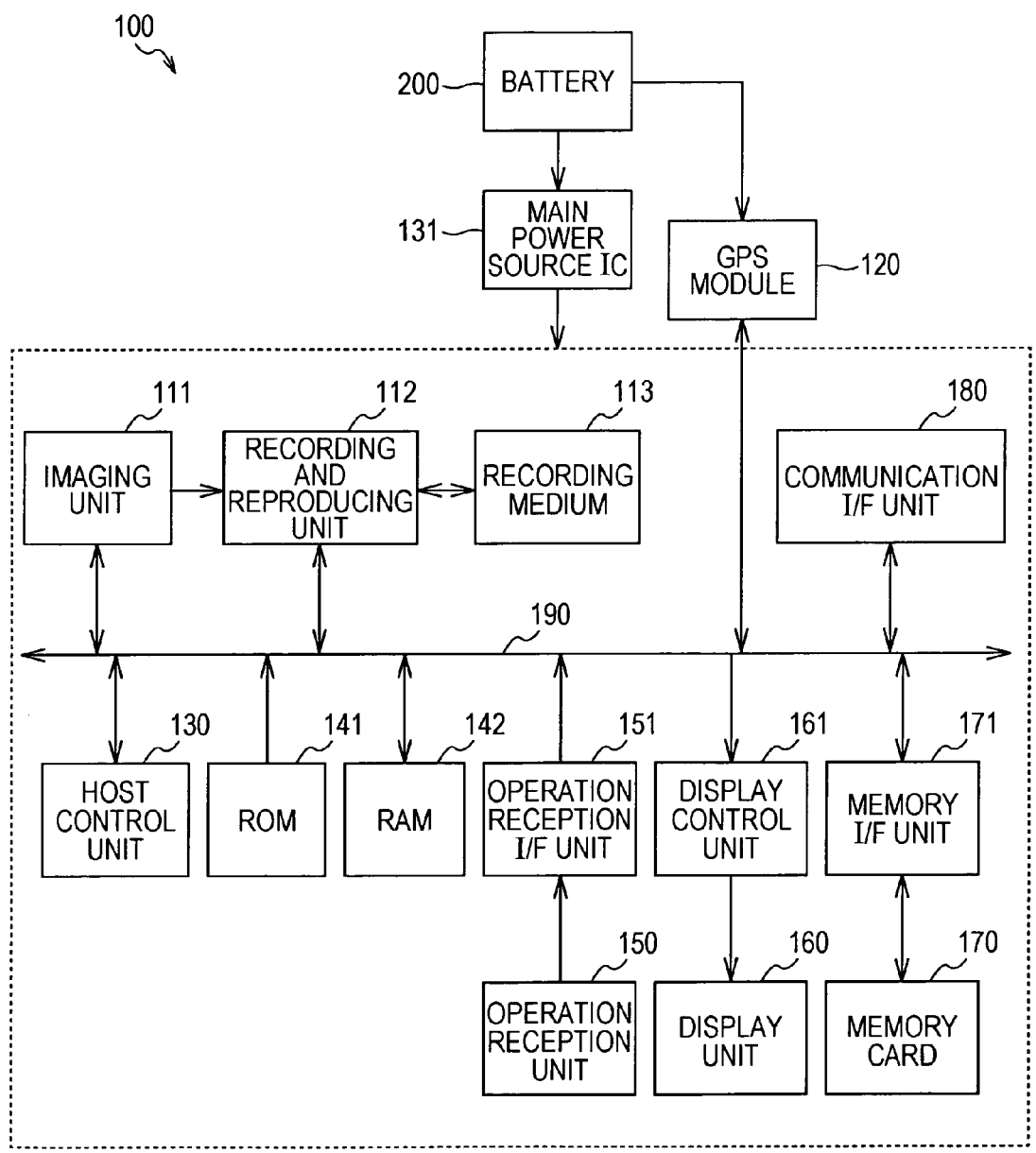
FIG. 1 is a block diagram showing an example of the internal configuration of an imaging apparatus according to a first embodiment of the present invention.

Hereinafter, embodiments (hereinafter, referred to as the embodiments) of the present invention will be described. The description will be presented in the following order.
1. First Embodiment (control of operation of positioning unit: example in which the operation of the positioning unit is controlled based on whether the process on the basis of a user operation uses positioning information and the operation mode of the positioning unit)
2. Second Embodiment (control of operation of positioning unit: example in which the positioning unit is in the standby state during an interval between intermittent operations)
3. Third Embodiment (control of operation of positioning unit: example in which position is updated by using predicted ephemeris data)
4. Modified Examples 1. First Embodiment Configuration Example of Imaging Apparatus FIG. 1 is a block diagram showing an example of the internal configuration of an imaging apparatus 100 according to a first embodiment of the present invention. The imaging apparatus 100 includes: an imaging unit 111; a recording and reproducing unit 112; a recording medium 113; a GPS module 120; a host control unit 130; and a main power source IC (Integrated Circuit) 131. In addition, the imaging apparatus 100 includes: a ROM (Read Only Memory) 141; a RAM (Random Access Memory) 142; an operation reception unit 150; and an operation reception I/F (interface) unit 151. Furthermore, the imaging apparatus 100 includes: a display unit 160; a display control unit 161; a memory card 170; a memory I/F unit 171; and a communication I/F unit 180. In addition, communication between the units configuring the imaging apparatus 100 is mainly performed through a bus 190. In addition, the imaging apparatus 100, for example, includes a GPS device and can be realized by using a digital still camera that can add positional information acquired by the GPS device to generated image data so as to be recorded. The imaging apparatus 100 is an example of an electronic apparatus according to an embodiment of the present invention.

The imaging unit 111 includes an imaging device (not shown) that converts light of a subject that is incident through a lens (not shown) into an electric signal and a signal processing section (not shown) that generates image data (captured image) by processing an output signal of the imaging device. In other words, in the imaging unit 111, an optical image of a subject that is incident through a lens is formed on an imaging surface of the imaging device, the imaging device performs an imaging operation in this state, and the signal processing section performs signal processing for an imaged signal, whereby image data is generated. The generation of the image data, in a case where a photographing mode is set, is performed based on imaging operation start directing information that is received by the operation reception unit 150. Then, the generated image data is sequentially supplied to the recording and reproducing unit 112.

The recording and reproducing unit 112 includes a codec and a recording and reproducing I/F. The recording and reproducing unit 112 records image data supplied from the imaging unit 111 on a recording medium 113 as an image file (an image file or a moving image file). When the recording operation is performed, positional information (positional information that is acquired last) acquired by the GPS module 120 and attribute information that includes date and time information at the time of recording are recorded in an image file. This attribute information, for example, can include various types of information (for example, F-value and ISO) at the time of imaging. In addition, the recording and reproducing unit 112 records image management information relating to the recorded image file in an image management file.

The recording medium 113 stores data of an image file and the like thereon and supplies each stored data unit to the recording and reproducing unit 112. The image file that is stored on the recording medium 113, for example, is an image file, for example, of Exif (Exchangeable image file format) specification. As the attribute information of the image file, the positional information, date and time information, and the like are recorded.

The GPS module 120 is supplied with power from a battery 200 and performs a positioning process. More specifically, the GPS module 120 acquires a navigation message (shown in FIG. 2) by demodulating satellite signals received from a plurality of GPS satellites by a GPS antenna (not shown) using a demodulation unit (not shown). Then, the GPS module 120 extracts ephemeris data from the acquired navigation message and maintains the extracted ephemeris data. In addition, similarly, the GPS module 120 extracts and maintains almanac data and the like. The ephemeris data is data relating to precise positional information of each GPS satellite and time information representing signal emission time, and the almanac data is orbital information of all the GPS satellites in orbit. In addition, the GPS module 120 calculates the positional information that represents the current position by performing a positioning process using the maintained positional information such as the ephemeris data, maintains the calculated positional information, and outputs the positional information to the host control unit 130. This positioning information is information (information acquired from the GPS satellites and information acquired based thereon, and, for example, it includes the above-described navigation message) that is used for calculating the positional information. In addition, the positioning information is data that is acquired by the GPS antenna of the GPS module 120 or another communication unit (a wired or wireless communication unit) (not shown)). In the calculated positional information, data relating to a position such as latitude, longitude, and altitude is included. The internal configuration of the GPS module 120 will be described in detail with reference to FIG. 3. Here, the GPS module 120 is an example of a positioning device according to an embodiment of the present invention.

The host control unit 130 performs each process (for example, a captured image generating process, a captured image recording process, an image reproducing process, or a communication process) of the imaging apparatus 100 based on various control programs that are stored in the ROM 141. In addition, the host control unit 130 controls the units of the imaging apparatus 100 based on an operation input or the like received by the operation reception unit 150.

The ROM 141 is a read-only memory and stores various control programs and the like therein.

The RAM 142 is a memory that is used as a main memory (main memory device) of the host control unit 130 and has a work area of the programs executed by the host control unit 130 and the like.

The operation reception unit 150 is an operation receiving unit that receives operation content according to an operation of a user and outputs a signal according to the received operation content to the host control unit 130 through the operation reception I/F unit 151. For example, a power button that is used for turning the power of the imaging apparatus 100 on/off and a shutter button 152 (shown in FIG. 6) are disposed on the imaging apparatus 100.

The display unit 160 is a display unit that displays various types of information under the control of the display control unit 161. As the display unit 160, for example, an LCD (Liquid Crystal Display), an organic EL (Electro Luminescence) panel, or the like can be used. In addition, the operation reception unit 150 and the display unit 160 may be integrally configured by a touch panel in which various operations can be performed by touching the touch panel with a finger or the like.

The display control unit 161 displays various types of information on the display unit 160 based on a user operation received by the operation reception unit 150 under the control of the host control unit 130.

The memory card 170 is a recording medium that is used as a memory unit for various types of data, programs, and the like. For example, the image data supplied through the memory I/F unit 171 is recorded on the memory card 170 as an image file. In addition, the image data stored on the memory card 170 is read out through the memory I/F unit 171 and is supplied to each unit in accordance with an operation input from a user that is received by the operation reception unit 150.

The communication I/F unit 180 is a communication interface that has an input/output terminal such as a USB (Universal Serial Bus) and provides an interface for connection with an external computer or a network connection. In addition, as the communication I/F unit 180, any of a wired interface and a wireless interface may be used.

The battery 200 is the main power source of the imaging apparatus 100 and supplies power to each unit through the main power source IC 131. In addition, the battery 200 supplies power to the GPS module 120.

Here, in the first embodiment of the present invention, one of a photographing mode, a reproducing mode, a communication mode, and a various setting mode is assumed to be set in the imaging apparatus 100 in accordance with a user operation. The photographing mode is a mode that is set, for example, in a case where the image data generated by the imaging unit 111 is recorded on the recording medium 113 or the memory card 170 as an image file or a moving image file. In addition, in the photographing mode, the recorded image data may be displayed in a preview style. The reproducing mode is a mode that is set, for example, in a case where data stored on the recording medium 113 or the memory card 170 is displayed in the display unit 160. The communication mode is a mode that is set, for example, in a case where various communication between the imaging apparatus 100 and an external apparatus is performed through the communication I/F unit 180. The various setting mode is a mode that is, for example, used for changing various settings on a menu screen.

In addition, in the first embodiment of the present invention, when the photographing mode is set, the power of the GPS module 120 is assumed to be in the ON state. On the other hand, when a mode other than the photographing mode (the reproducing mode, the communication mode, or the various setting mode) is set, it is assumed that the power of the GPS module 120 is in the OFF state or the GPS module 120 is in a standby mode. The standby mode of the GPS module will be described in a second embodiment of the present invention. In addition, for example, in a case where the photographing mode is set, when a switching operation for switching to another mode is performed, or when the power of the imaging apparatus 100 is turned off, the power of the GPS module 120 is assumed to be in the ON state for a predetermined time depending on predetermined conditions. Such control will be described in detail with reference to FIGS. 3 to 8C and the like.

Structure of Navigation Message

Figure 2:
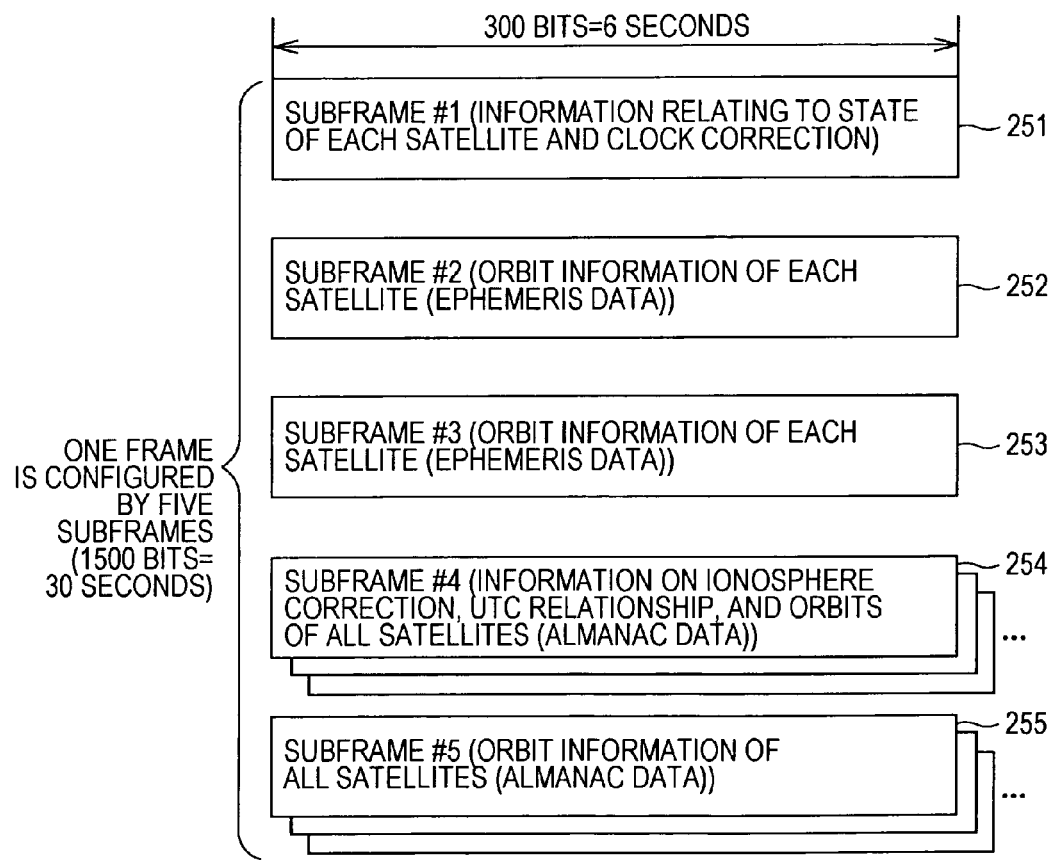
FIG. 2 is a diagram schematically showing the structure of a navigation message that is acquired by a GPS module according to the first embodiment of the present invention.

FIG. 2 is a diagram schematically showing the structure of a navigation message that is acquired by the GPS module 120 according to the first embodiment of the present invention. This navigation message is data that is transmitted from each GPS satellite with while carried in a distance measuring signal.

One cycle of the navigation message is configured in units termed frames, and one frame is configured by five sets of sub frames. More specifically, in the navigation message, one frame (1500 bits) is configured by sub frames #1 (251) to #5 (255). The subframes #1 (251) to #5 (255) respectively has a size of 300 bits. The data speed of the navigation message is about 50 bps (Bits Per Second). When the transmission is sequentially started from the sub frame #1 (251), and the transmission of the sub frame #5 (255) is completed, the transmission of the sub frame #1 (251) is started again. In other words, in the navigation message, each frame is transmitted for 30 seconds, repeatedly.

The sub frames #1 (251) to #3 (253) are subframes that include unique information of a GPS satellite that transmits the satellite signal, and the same content is repeatedly transmitted at an interval of 30 seconds. More specifically, information of the GPS satellite state and clock correction is included in the sub frame #1 (251), and the orbital information (ephemeris data) of the GPS satellite is included in the sub frames #2 (252) and #3 (253).

The ephemeris data is detailed orbital information that represents the orbit in which the GPS satellite revolves. In order to accurately measure the current position, it is necessary for the GPS module 120 to acquire the ephemeris data from at least four GPS satellites. The effective time of the ephemeris data is four hours. However, since the GPS satellite seen from the same location changes approximately every two hours, generally, the effective time of the ephemeris data is two hours. The GPS module 120 can perform position measurement in a relatively short time (for example, about 3 seconds to 5 seconds) using effective ephemeris data and the time information. More specifically, the GPS module 120 calculates positional information representing the current position of the imaging apparatus 100 by measuring the current position of the imaging apparatus 100 based on the ephemeris data and distance data from four GPS satellites to the imaging apparatus 100. Then, the GPS module 120 maintains the calculated positional information and outputs the positional information to the host control unit 130.

When, the effective time of the maintained ephemeris data elapses, it is necessary to newly acquire the ephemeris data. Here, as described above, since the ephemeris data is transmitted from the GPS satellite at an interval of about 30 seconds, in order to acquire new ephemeris data, a time of 30 seconds or longer is necessary even at minimum.

In addition, sub frames #4 (254) and #5 (255) are subframes that include information relating to all the GPS satellites, and the same content is transmitted from all the GPS satellites. In addition, in the sub frames #4 (254) and #5 (255), outlined satellite information (almanac data) of all the GPS satellites, ionosphere correction information, and the like are included. Since the amount of data included in the sub frames #4 (254) and #5 (255) is large, data is stored in pages 1 to 25 in a divisional manner. In other words, different content of pages (pages 1 to 25) are sequentially transmitted for each frame. Accordingly, in a case where all the data included in the sub frames #4 (254) and #5 (255) is, acquired from the GPS satellite, a time of 12 minutes 30 seconds (30 seconds× 25) is necessary.

In addition, in the sub frame #4 (254), ionosphere correction information, Coordinated Universal Time (UTC), and the outlined satellite information (almanac data) are included. In the sub frame #5 (255), the outlined satellite information (almanac data) is included. In addition, although the almanac data, compared to the ephemeris data, is data having relatively low precision, relatively old almanac data can also be used. For example, there are many cases where almanac data several weeks before is effective.

Configuration Example of GPS Module

Figure 3:
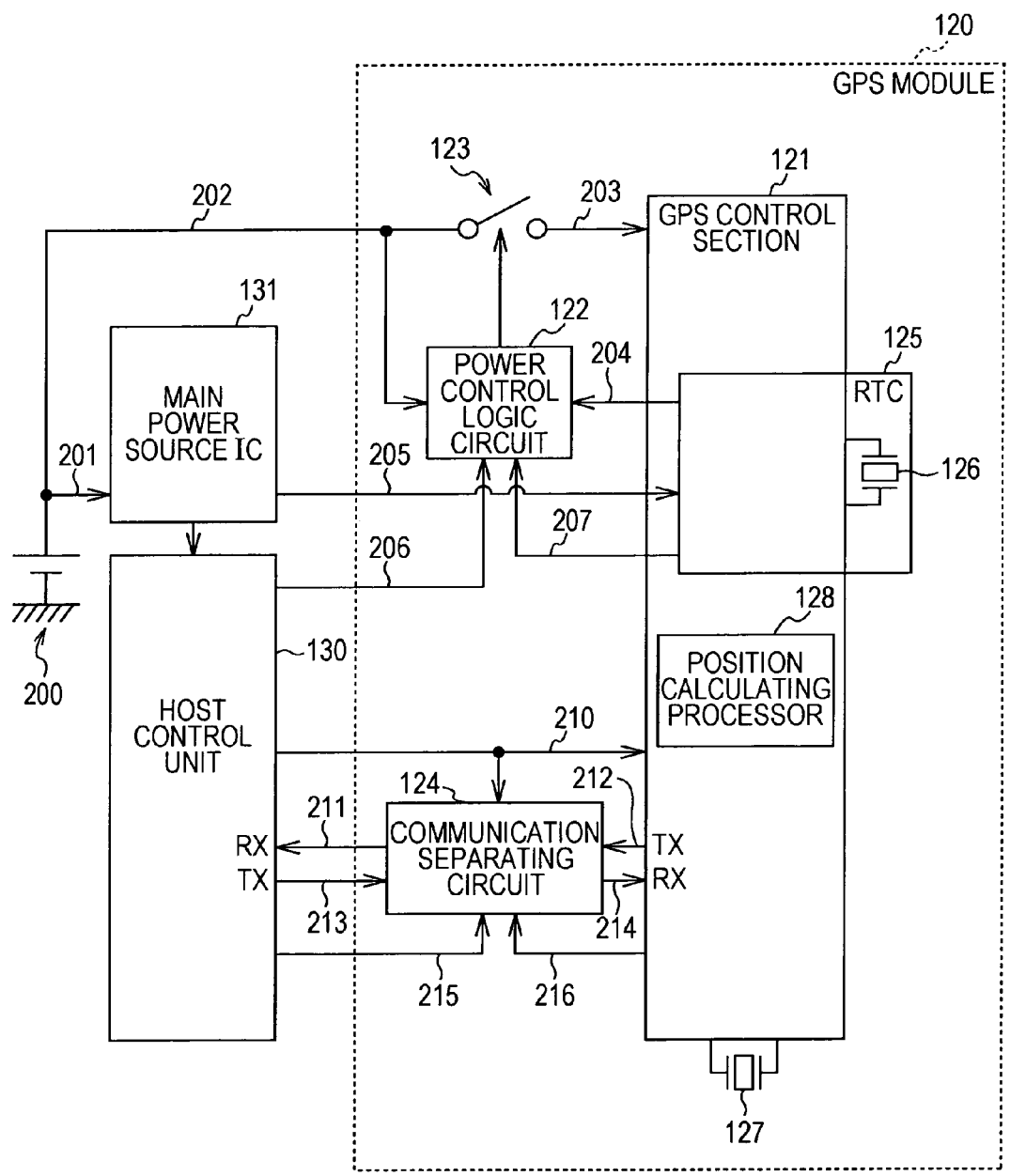
FIG. 3 is a diagram showing an example of the internal configuration of the GPS module according to the first embodiment of the present invention.

FIG. 3 is a diagram showing an example of the internal configuration of the GPS module 120 according to the first embodiment of the present invention. In FIG. 3, the host control unit 130 and the battery 200 shown in FIG. 1 are shown, and the relationship between them and the GPS module 120 is schematically represented.

FIG. 4 is a diagram schematically representing the control content of a power control logic circuit 122 according to the first embodiment of the present invention. The control content of the power control logic circuit 122 shown in FIG. 4 will be described with reference to FIG. 3.

The GPS module 120 includes a GPS control section 121, a power control logic circuit 122, a power switch 123, and a communication separating circuit 124.

The battery 200 is a battery that supplies power to the GPS module 120 and the host control unit 130. More specifically, the battery 200 supplies power (main power) to the host control unit 130 through the main power supply line 201 and the main power source IC 131, and supplies power (main power) to the GPS control section 121 through power supply lines 202 and 203. Since a power sequence different from that of other systems is necessary for the power supply lines 202 and 203, the power supply lines 202 and 203 are configured as independent power supply lines used for the GPS module 120.

The GPS control section 121 is a control circuit that controls the GPS module 120, and an RTC (Real Time Clock) 125 and a position calculating processor 128 are built therein. The GPS control section 121 performs various communications with the host control unit 130 through the communication separating circuit 124. In addition, the GPS control section 121 performs a positioning process in accordance with various control programs stored in a memory (not shown) such as a non-volatile memory under the control of the host control unit 130. This positioning process, for example, is a process in an ephemeris data acquiring mode, a satellite capture mode, and a position update mode.

Here, the ephemeris data acquiring mode is an operation mode used for acquiring a navigation message from a GPS satellite and extracting the ephemeris data from the acquired navigation message. In this operation, reception of a navigation message, specifying of a GPS satellite, transmission of satellite information to the host control unit 130, and the like are performed. In addition, when the position measurement is completed, the positional information is transmitted to the host control unit 130. In the ephemeris data acquiring mode, other information used for position measurement is also extracted together with the ephemeris data.

The satellite capture mode is an intermittent operation mode that is used for searching for a satellite signal transmitted from a GPS satellite and specifying a GPS satellite located thereabove. The intermittent operation time is set to a time that is sufficient for determining the position measurability in the current situation after a cold start. Accordingly, in the intermittent operation, for example, an operation time of about 10 seconds to 20 seconds is necessary, and the operation time of the intermittent operation mode is relatively long. In the intermittent operation, reception of a navigation message, specifying of a satellite, transmission of satellite information to the host control unit 130, and the like are performed. When the position measurement is completed, the positional information is transmitted to the host control unit 130. In the first embodiment of the present invention, specifying a GPS satellite by capturing a GPS signal is described as "capturing a GPS satellite".

The position update mode is an intermittent operation mode that is used for positioning the current position and sequentially updating the current position. Since this position update mode is an intermittent operation mode that transits only in the state in which a hot start can be made, the operation time thereof can be set to a relatively short time (for example, 5 seconds or shorter). In addition, in this intermittent operation, a navigation message is received, a positioning process is performed using the ephemeris data, the time information, and the like that are maintained, and the result of the positioning is transmitted to the host control unit 130. In addition, the GPS control section 121 has a function of transmitting the result of positioning to the host control unit 130 each predetermined interval (for example, an interval of one second). In the communication performed each predetermined interval, even when the position is not measured, the information of the GPS satellite that is currently captured and the like are transmitted to the host control unit 130.

Figure 9:
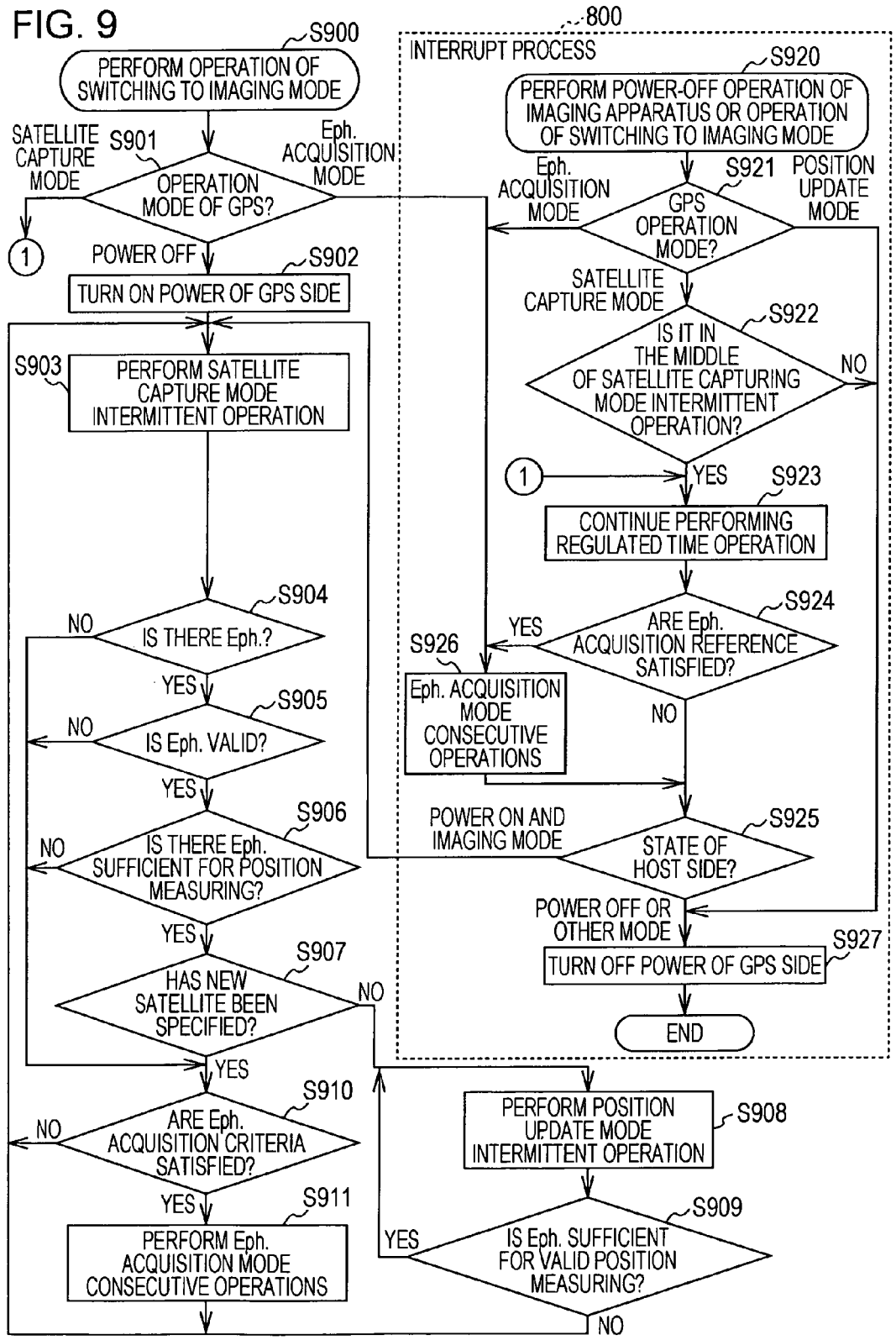
FIG. 9 is a flowchart showing an example of the processing sequence of a positioning process performed by the imaging apparatus according to the first embodiment of the present invention.

As above, in the first embodiment of the present invention, when the satellite capture mode or the position update mode is set as the operation mode of the GPS module 120, an intermittent operation for each operation is performed. An example of the intermittent operation is shown in FIG. 9.

An RTC 125 is a circuit dedicated for measuring time that operates by being supplied with power from a constant power source, which is generated by the main power source IC 131, through the power supply line 205 even when the power is cut off. An oscillator 126 is an oscillation source used for generating a clock signal that is supplied to the inside of the RTC 125. As the oscillator 126, for example, a crystal oscillator (for example, a frequency of 32.768 k (Hz)) is used.

The position calculating processor 128 is a processor that calculates the current position of the imaging apparatus 100 based on the ephemeris data and the data of distance from four or more GPS satellites to the imaging apparatus 100 that are maintained in the GPS module 120. The calculated positional information representing the current position is sequentially recorded in a memory (not shown) of the GPS module 120 and is output to the host control unit 130 through the communication separating circuit 124.

The power control logic circuit 122 is a circuit that is responsible for ON/Off of the power of the GPS control section 121 and is, for example, configured by a discrete semiconductor and a linear IC. More specifically, the power control logic circuit 122 controls ON/OFF of the power of the GPS control section 121 based on a control signal output from the host control unit 130, an intermittent operation time control signal and a control signal that are output from the RTC 125, and monitoring of the voltage of the battery 200. The power control logic circuit 122 performs opening or closing of the power switch 123, for example, by outputting a binary control signal that represents ON/OFF of the power of the GPS control section 121 to the power switch 123. The power switch 123, for example, is configured by an FET (Field Effect Transistor), and ON/OFF of the power of the GPS control section 121 is controlled in accordance with the opening or closing of the power switch 123.

Here, the control signal output from the host control unit 130 is a control signal that represents a trigger (power-on trigger) used for turning on the power of the GPS module 120 and is input through a signal line 206. This control signal, for example, may be a control signal of a "H (high)" level, and a "L (low)" level. In addition, as this power-on trigger, for example, when the imaging apparatus 100 is in a state in which the positioning information is necessary, a control signal of the "H" level is output. In addition, by maintaining "H", even when the GPS control section 121 is in the middle of an intermittent operation, power is forcibly supplied to the GPS control section 121 so as to operate the GPS control section 121, whereby a command such as a mode transition can be reliably transmitted to the GPS control section 121. In addition, the state in which the positioning information is necessary for the imaging apparatus 100, for example, is a case where a switching operation for switching to the photographing mode in a case where a mode other than the photographing mode is set, or a case where the power of the imaging apparatus 100 is turned on and the photographing mode is set.

The control signal output from the RTC 125 is a control signal that represents whether or not the host control unit 130 demands start-up of the GPS module 120 (whether or not the imaging apparatus 100 is in the state in which the positioning information is necessary) and is input through a signal line 207. This control signal, for example, may be a signal of the "H" level and the "L" level. This control signal is generated based on a notification from the host control unit 130 that is input through a signal line 210. For example, since a 32k_out terminal that amplifies the output of the crystal oscillator to have an amplitude of 1.2 V and outputs the amplified output has two states including a state in which there is an output and a state in which there is no output, this can be used as the control signal and is converted into H/L inside the power control logic circuit 122. More specifically, the state in which there is an output of the 32k_out terminal is converted into "L", and the state in which there is no output of the 32k_out terminal is converted into "H". Hereinafter, for simplification of the description, the result of conversion inside the power control logic circuit 122 will be described as the output from the signal line 207. This applies the same in FIG. 4.

In addition, the intermittent operation time control signal that is output from the RTC 125 is a control signal that represents the content of the operation of the GPS module 120 and is input through a signal line 204. For example, the intermittent operation time control signal may be a control signal of the "H" level and the "L" level. For example, in a case where the operation mode of the GPS module 120 is the ephemeris data acquiring mode, as the intermittent operation time control signal, a control signal of the "H" level is output. In addition, in a case where the operation mode of the GPS module 120 is the satellite capture mode, during a period (execution period) during which a satellite capturing operation is performed, a control signal of the "H" level is output as the intermittent operation time control signal. On the other hand, during a period (intermittent period) during which the satellite capturing operation is not performed, a control signal of the "L" level is output as the intermittent operation time control signal. In addition, in a case where the operation mode of the GPS module 120 is the position update mode, during a period (execution period) during which the position update operation is performed, a control signal of the "H" level is output as the intermittent operation time control signal. On the other hand, during a period (the intermittent period) during which the position update operation is not performed, a control signal of the "L" level is output as the intermittent operation time control signal.

The power switch 123 is a switch that switches ON/OFF of power supply to the GPS module 120 from the battery 200 under the control of the power control logic circuit 122. Here, the power switch 123 is an example of a switching unit according to an embodiment of the present invention.

Here, control of the power switch 123 using the power control logic circuit 122 will be described with reference to FIG. 4. The first thing is a supply voltage of the power supply line 202, thus, when this voltage is beyond the operating assurance voltage range of the GPS control section 121, the power switch 123 is necessarily controlled to be open. Thus, hereinafter, the description will be presented assuming a case where the voltage of the power supply line 202 is within the operating assurance voltage range of the GPS control section 121. In the power supply line 202 shown in FIG. 4, a case where the voltage is within the operating assurance voltage range of the GPS control section 121 is denoted by "*1", and a case where the voltage is beyond the operating assurance voltage range of the GPS control section 121 is denoted by "*2".

For example, a case where a control signal of the "H" level is output from the host control unit 130 through the signal line 206, the power control logic circuit 122 outputs a control signal used for closing the power switch 123 to the power switch 123.

Next, for example, a case where a control signal of the "L" level is output from the RTC 125 through the signal line 207 will be considered. In this case, when a control signal of the "H" level is output through the signal line 204, the power control logic circuit 122 outputs a control signal used for closing the power switch 123 to the power switch 123. Accordingly, power is supplied to the GPS module 120. On the other hand, when a control signal of the "L" level is output through the signal line 204, the power control logic circuit 122 outputs a control signal used for opening the power switch 123 to the power switch 123. Accordingly, the power supply to the GPS module 120 is stopped.

Next, for example, a case where a control signal of the "H" level is output through the signal line 207 will be considered. In this case, even when a control signal of the "H" level or a control signal of the "L" level is output through the signal line 204, the power control logic circuit 122 regards the output to be "L" and outputs a control signal used for opening the power switch 123 to the power switch 123. Accordingly, the power supply to the GPS module 120 is stopped.

Next, for example, a case where a control signal of the "L" level is output through the signal line 207 will be considered. In this case, when a control signal of the "H" level is output from any one or both of the signal lines 206 and 204, a control signal used for closing the power switch 123 is output to the power switch 123. Accordingly, power is supplied to the GPS module 120. On the other hand, when a control signal of the "L" level is output from both the signal lines 206 and 204, a control signal used for opening the power switch 123 is output to the power switch 123. Accordingly, the power supply to the GPS module 120 is stopped.

The communication separating circuit 124 is a circuit that is used for opening and closing communication lines 211 and 212 and communication lines 213 and 214. For example, when a mode other than the photographing mode is set in the imaging apparatus 100, only the host control unit 130 (the host side) is in the ON state, and the GPS module 120 is in the OFF state. In addition, for example, when the photographing mode is set, in a case where the power of the imaging apparatus 100 is in the OFF state, only the GPS module 120 is in the ON state, and the host control unit 130 (the host side) may be in the OFF state. Accordingly, in order not to apply a voltage to a circuit of which the power is in the OFF state, the communication separating circuit 124 opens and closes the communication lines 211 and 212 and the communication lines 213 and 214. In other words, the communication separating circuit 124 is a circuit corresponding to switches of the communication lines 211 to 214. In addition, in this example, a case in which the GPS module 120 includes the communication separating circuit 124 is shown. However, depending on the specifications of the IC, the communication separating circuit 124 may be omitted.

The signal line 210 is a signal line that is used for transmitting a control signal that is output from a host-side ready notification port of the host control unit 130 and is input to a host state monitoring port of the GPS control section 121 and the communication separating circuit 124. More specifically, the signal line 210 is a signal line that is used for transmitting a control signal used for notifying the GPS control section 121 whether or not the host control unit 130 demands start-up of the GPS module 120 and opening the reception side of the host control unit 130 of the communication separating circuit 124. In accordance with this control signal, transmission data transmitted from the GPS control section 121 can be received. For example, the control signal may be a control signal of the "H" level and the "L" level. For example, when the host control unit 130 demands start-up of the GPS module 120, a control signal (notification information) of the "H" level is output through the signal line 210. While the host control unit 130 demands startup of the GPS module 120, a control signal of the "H" level is output as the notification information.

Here, the GPS control section 121 generates a control signal that is output to the power control logic circuit 122 through the signal line 207 based on the control signal that is input to the host state monitoring port of the GPS control section 121 through the signal line 210. More specifically, when a control signal of the "H" level is output through the signal line 210, the GPS control section 121 outputs a control signal of the "L" level through the signal line 207. On the other hand, when a control signal of the "L" level is output through the signal line 210, the operation mode of the GPS module 120 is checked. For example, when the operation mode of the GPS module 120 is the position update mode, in order to stop the supply of power to the GPS module 120, the GPS control section 121 outputs a control signal of the "H" level through the signal line 207. In addition, for example, when the operation mode of the GPS module 120 is the satellite capture mode and is in the middle of the operation or when the operation mode of the GPS module 120 is the ephemeris data acquiring mode, the supply of power to the GPS module 120 is continued until such an operation is completed. Accordingly, the GPS control section 121 outputs a control signal of the "L" level through the signal line 207.

The communication lines 211 to 214 are signal lines that are used for transmission and reception of various types of data between the host control unit 130 and the GPS control section 121. For example, a command directing the operation mode of the GPS module 120 is output to the GPS control section 121 from the host control unit 130 through the communication lines 213 and 214. In addition, for example, the positional information calculated by the GPS module 120 is output to the host control unit 130 from the GPS control section 121 through the communication lines 212 and 211. In addition, for communication through the signal lines 211 to 214, a communication circuit such as a UART (Universal Asynchronous Receiver Transmitter) can be used.

A signal line 215 is a signal line for transmitting a control signal used for opening the GPS control section 121 reception side (GPS reception side) of the communication separating circuit 124, so that transmission data transmitted from the host control unit 130 (host side) can be received by the GPS module 120. For example, by transmitting a control signal of the "H" level, the GPS control section 121 reception side (GPS reception side) of the communication separating circuit 124 is open. For example, although the GPS control section 121 reception side (GPS reception side) of the communication separating circuit 124 is normally opened by the GPS control section 121, when the firmware of the GPS control section 121 is uploaded, a case where the GPS control section 121 reception side is not open from the GPS side can be considered. Particularly, when the firmware is written for the first time, a case where the GPS control section 121 reception side is not open from the GPS side can be considered. Accordingly, for example, by transmitting a control signal of the "H" level through the signal line 215, the GPS control section 121 reception side (GPS reception side) of the communication separating circuit 124 can be open.

A signal line 216 is a signal line for transmitting a control signal used for opening the GPS control section 121 reception side (GPS reception side) of the communication separating circuit 124 in a case where the GPS module 120 is supplied with power and is in the state in which a command can be received from the host control unit 130. For example, by transmitting a control signal of the "H" level through the signal line 216, the GPS control section 121 reception side (GPS reception side) of the communication separating circuit 124 is open.

The oscillator 127 is an oscillation source used for generating a clock signal supplied to the inside of the GPS control section 121, and, for example, a crystal oscillator (TCXO) is used as the oscillator 127.

Example of Functional Configuration of Imaging Apparatus

Figure 5:
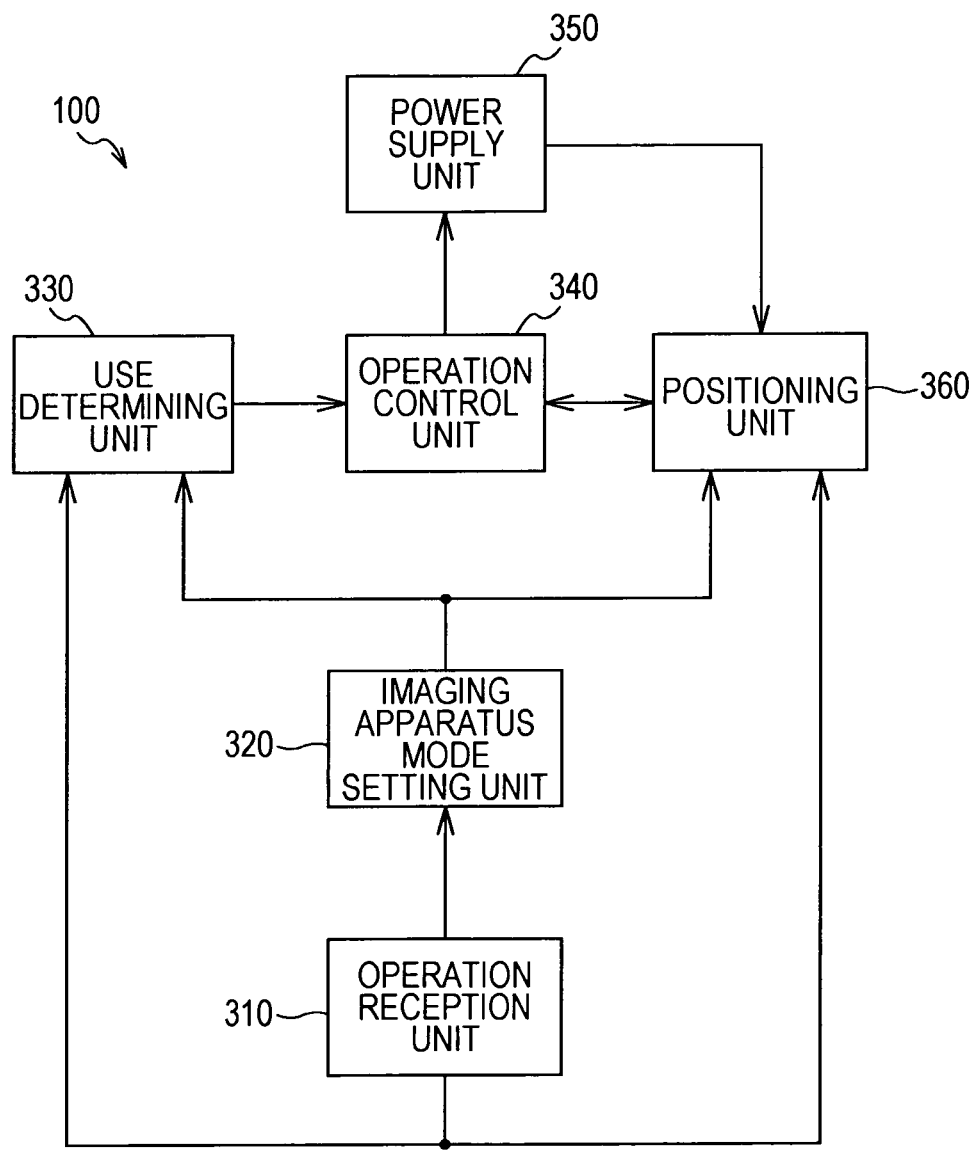
FIG. 5 is a block diagram representing an example of the functional configuration of an imaging apparatus according to the first embodiment of the present invention.

FIG. 5 is a block diagram representing an example of the functional configuration of the imaging apparatus 100 according to the first embodiment of the present invention. The imaging apparatus 100 includes: an operation reception unit 310; an imaging apparatus mode setting unit 320; a use determining unit 330; an operation control unit 340; a power supply unit 350; and a positioning unit 360.

The operation reception unit 310 is an operation receiving unit that receives a user operation input and outputs the operation content corresponding to the received operation input to the imaging apparatus mode setting unit 320, the use determining unit 330, and the positioning unit 360. For example, when receiving an operation of the power source for turning the power of the imaging apparatus 100 ON/OFF, the operation reception unit 310 outputs the operation content to the use determining unit 330 and the positioning unit 360. On the other hand, for example, when receiving a switching operation for switching between the modes of the imaging apparatus 100, the operation reception unit 310 outputs the operation content to the imaging apparatus mode setting unit 320. This switching operation, for example, is a switching operation for switching from the photographing mode to another mode (the reproducing mode, the communication mode, or the various setting mode) or a switching operation to the photographing mode from another mode (the reproducing mode, the communication mode, or the various setting mode). The operation reception unit 310 corresponds to the operation reception unit 150 shown in FIG. 1.

The imaging apparatus mode setting unit 320 sets the mode to one of the photographing mode, the reproducing mode, the communication mode, and the various setting mode in accordance with the switching operation received by the operation reception unit 310. Then, the imaging apparatus mode setting unit 320 outputs the content of the setting to the use determining unit 330 and the positioning unit 360. Here, the imaging apparatus mode setting unit 320 corresponds to the host control unit 130 shown in FIGS. 1 and 3.

When the operation reception unit 310 receives an operation input, the use determining unit 330 determines whether or not the process on the basis of the operation input is a process (predetermined process) that uses the positioning information acquired by the positioning unit 360. In other words, when the operation reception unit 310 receives an operation input, the use determining unit 330 determines whether or not the process on the basis of the operation input is a predetermined process that uses the positioning unit 360. For example, when a power operation for turning off the power of the imaging apparatus 100 is received, the use determining unit 330 determines that the process on the basis of the operation input is not the predetermined process. In addition, for example, in a case where the photographing mode is set, when a switching operation for switching from the photographing mode to another mode (the reproducing mode, the communication mode, or the various setting mode) is received, the use determining unit 330 determines that the process on the basis of the operation input is not the predetermined process. On the other hand, for example, when a power operation for turning on the power of the imaging apparatus 100 is received, in a case where the photographing mode is set, the use determining unit 330 determines that the process on the basis of the operation input is the predetermined process. In addition, for example, in a case where a mode other than the photographing mode is set, when a switching operation for switching from the mode to the photographing mode is received, the use determining unit 330 determines that the process on the basis of the operation input is the predetermined process. Then, the use determining unit 330 outputs the result of the determination to the operation control unit 340. In addition, the use determining unit 330, in a case where the imaging apparatus 100 is in a standby state (waiting state), may be configured to determine whether or not a process performed in the standby state is the predetermined process. The use determining unit 330 corresponds to the host control unit 130 shown in FIGS. 1 and 3. Here, the use determining unit 330 is an example of a determination unit according to an embodiment of the present invention.

The operation control unit 340 controls the supply of power to the positioning unit 360 based on the result of the determination output from the use determining unit 330 and the operation mode of the positioning unit 360 that is output from the positioning unit 360, whereby controlling the operation of the positioning unit 360. For example when the result of the determination indicating that the process on the basis of the operation input is the predetermined process is output from the use determining unit 330, the operation control unit 340 controls to supply power to the positioning unit 360, whereby controlling to operate the positioning unit 360. In addition, for example, when the result of the determination indicating that the process on the basis of the operation input is not the predetermined process is output from the use determining unit 330, the operation control unit 340 controls the operation of the positioning unit 360 based on the operation mode of the positioning unit 360. In other words, when the operation mode of the positioning unit 360 is the ephemeris data acquiring mode, or when the operation mode is the satellite capture mode and the positioning unit 360 is in the middle of the operation, the operation control unit 340 controls to supply power to the positioning unit 360 until the operation is completed. Accordingly, it is controlled that the operation of the positioning unit 360 is continued until the operation is completed, and the positioning unit 360 is stopped after the operation is completed. In addition, when the operation mode of the positioning unit 360 is the position update mode or when the operation mode is the satellite capture mode but the positioning unit 360 is not in the middle of the operation, the operation control unit 340 controls to stop the supply of power to the positioning unit 360, whereby controlling to stop the positioning unit 360. The operation control unit 340 corresponds to the GPS control section 121 and the power control logic circuit 122 shown in FIG. 3. This operation control will be described in detail with reference to FIGS. 7A to 8C. Here, the operation control unit 340 is an example of a control unit and an acquisition unit according to an embodiment of the present invention. In addition, a case where the operation mode is the ephemeris data acquiring mode or the satellite capture mode and it is in the middle of the operation is an example of the first mode according to an embodiment of the present invention. On the other hand, the OFF state of the positioning unit 360 after the positioning unit 360 is stopped is an example of the second mode according to an embodiment of the present invention.

The power supply unit 350 supplies power to the positioning unit 360 under the control of the operation control unit 340. Here, the power supply unit 350 corresponds to the battery 200 shown in FIGS. 1 and 3.

The positioning unit 360 receives position measurement information that is necessary for a positioning process from the outside and performs a positioning process by being supplied with power from the power supply unit 350. For example, when the photographing mode is set by the imaging apparatus mode setting unit 320, the positioning unit 360 performs a positioning process by being supplied with power from the power supply unit 350. In addition, the positioning unit 360 outputs the current operation mode (the ephemeris data acquiring mode, the satellite capture mode, or the position update mode) to the operation control unit 340. The positioning unit 360 corresponds to the GPS module 120 shown in FIGS. 1 and 3. Here, the positioning unit 360 is an example of a reception unit according to an embodiment of the present invention.

Example of Display of Position Acquiring Mode on Designated Screen

Figure 6:
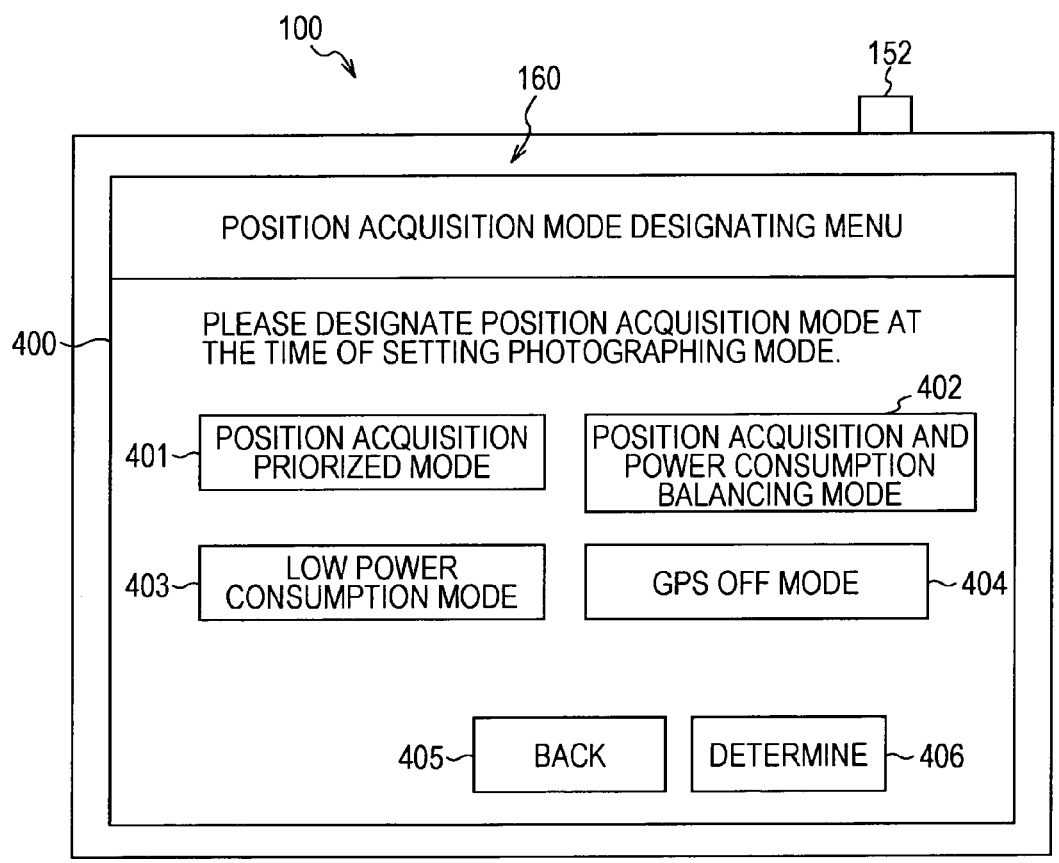
FIG. 6 is a diagram representing a display example of a display unit according to the first embodiment of the present invention.

FIG. 6 is a diagram representing a display example (a position acquiring mode designating screen 400) of the display unit 160 according to the first embodiment of the present invention. The position acquiring mode designating screen 400 is a screen that is used for designating the position acquiring mode when the photographing mode is set. In addition, on the position acquiring mode designating screen 400, a plurality of buttons used for designating the position acquiring mode, a back button 405, and a determination button 406 are disposed. As the plurality of buttons used for designating the position acquiring mode, a "position acquisition prioritized mode" button 401 and a "position acquisition/power consumption balanced mode" button 402, a "low power consumption mode" button 403, and a "GPS OFF mode" button 404 are disposed. In addition, the position acquiring mode designating screen 400, for example, is displayed in the display unit 160 when an operation input for setting the photographing mode is performed.

The "position acquisition prioritized mode" button 401 is a button that is pressed when the position acquisition prioritized mode is designated. The position acquisition prioritized mode is a mode in which a positioning operation is performed by supplying power to the positioning unit 360 all the time in a case where the photographing mode is set. In other words, when the photographing mode is set and the position acquisition prioritized mode is designated, the positioning unit 360 is in the state of operating all the time. Accordingly, although the latest positioning information can be used, the power consumption is high.

The "position acquisition/power consumption balanced mode" button 402 is a button that is pressed when the position acquisition/power consumption balanced mode is designated. The position acquisition/power consumption balanced mode is a mode in which the positioning operation is performed by appropriately supplying power to the positioning unit 360 in accordance with the operation mode of the positioning unit 360. In addition, when the power is turned off by a user operation or an operation input for mode switching for switching to a mode other than the photographing mode is made, the supply of power to the positioning unit 360 is continued for a predetermined period under predetermined conditions. In other words, the position acquisition/power consumption balanced mode is an operation mode in which the processing sequence shown in FIG. 9 is performed. In the first embodiment of the present invention, a case where the position acquisition/power consumption balanced mode is set will be described as an example.

The "low power consumption balanced mode" button 403 is a button that is pressed when the low power consumption mode is designated. The low power consumption mode is a mode in which the positioning operation is performed by appropriately supplying power to the positioning unit 360 in accordance with the operation mode of the positioning unit 360 when the photographing mode is set. In addition, when the power is turned off by a user operation or an operation input for mode switching for switching to a mode other than the photographing mode is made, the supply of power to the positioning unit 360 is stopped in accordance with the operation input. In other words, the low power consumption mode is an operation mode in which an interrupt process 800 is not performed in the processing sequence shown in FIG. 9. Accordingly, by eliminating the state in which only the GPS operates, the power consumption can be reduced. However, the operation of the GPS is stopped even in the middle of acquisition of the ephemeris data, and thereby the acquisition of the positional information may be delayed.

The "GPS OFF mode" button 404 is a button that is pressed when the GPS OFF mode is designated. The GPS OFF mode is a mode in which the positioning operation is not performed. In other words, even in a case where the photographing mode is set, when the GPS OFF mode is designated, power is not supplied to the positioning unit 360, whereby the positioning unit 360 is in the OFF state. Accordingly, although the power consumption can be reduced, it is difficult to use the position measurement information.

The determination button 406 is a button that, after a pressing operation for designating the position acquiring mode is performed, is pressed when the designation is determined. The back button 405, for example, is a button that is pressed in a case where a display screen is returned to a display screen displayed immediately before.

Example of Control of Operation of Positioning Unit

FIGS. 7A to 7C and FIGS. 8A to 8C are sequence charts showing cases where the operation of the positioning unit 360 is controlled by the operation control unit 340 according to the first embodiment of the present invention. The examples shown in FIGS. 7A to 8C schematically show the relationship between the mode 421 of the imaging apparatus 100 that is set by the imaging apparatus mode setting unit 320, the operation mode 422 of the positioning unit 360, and the supply 423 of power to the positioning unit 360. In addition, the mode 421 of the imaging apparatus 100 is any one of the photographing mode, the reproducing mode, the communication mode, and the various setting mode. The vertical axes shown in FIGS. 7A to 8C represent time axes.

FIGS. 7A to 8C represent examples of operation control in a case where the photographing mode is set by the imaging apparatus mode setting unit 320. In the example represented in FIGS. 7A to 7C, a case where a power operation for turning off the power of the imaging apparatus 100 is performed in a case where the photographing mode is set will be described. In the example shown in FIGS. 7A to 7C, since the photographing mode is set, it is assumed that power is supplied to the positioning unit 360 from the power supply unit 350.

FIG. 7A shows a case where the satellite capture mode is set as the operation mode 422 of the positioning unit 360, and a satellite capturing operation in the satellite capture mode is in the middle of the process. As above, in a case where a power operation for turning off the power of the imaging apparatus 100 is performed in the middle of the satellite capturing operation, as denoted by an arrow 431, the use determining unit 330 determines whether or not the positioning unit 360 is necessary. In this case, although the photographing mode is set, the power of the imaging apparatus 100 is turned on, and accordingly, an imaging process in the photographing mode is not performed. Thus, the position measurement information acquired by the positioning unit 360 is not used. Accordingly, the use determining unit 330 outputs the result of the determination indicating that the position measurement information acquired by the positioning unit 360 is not used to the operation control unit 340.

Since the determination result indicating no use of the position measurement information acquired by the positioning unit 360 is output from the use determining unit 330, the operation control unit 340 determines whether or not the supply of power to the positioning unit 360 is necessary based on the operation mode of the positioning unit 360. Here, since the satellite capture mode is set as the operation mode 422 of the positioning unit 360, and the satellite capturing operation is in the middle of the process in the satellite capture mode, the operation control unit 340 continues to supply the power until the satellite capturing operation is completed. Then, when the satellite capturing operation is completed, as denoted by an arrow 432, the operation control unit 340 stops the supply of power to the positioning unit 360.

In addition, it may be configured that the positioning unit 360 determines whether or not acquisition criteria for acquiring the ephemeris data are satisfied, and when the acquisition criteria are satisfied, an ephemeris data acquiring operation in the ephemeris data acquiring mode is performed. For example, a case where the angles of all the target GPS satellites are equal to or greater than a predetermined angle, and signal strength (CNR) from at least one GPS satellite is equal to or higher than a predetermined value can be used as the acquisition criteria. When the acquisition criteria are satisfied, an ephemeris data acquiring operation is performed, and until the ephemeris data acquiring operation is completed, the operation control unit 340 continues to supply power to the positioning unit 360.

In addition, it may be configured that, when the satellite capturing operation is completed and the ephemeris data acquiring operation is completed, whether or not a power operation for turning on the power of the imaging apparatus 100 is performed is determined, and, when the power operation for turning the power on is performed, the supply of the power to the positioning unit 360 is continued. In such a case, the positioning unit 360 transits to the satellite capture mode, and an intermittent operation in the satellite capture mode is performed.

In addition, in a case where the satellite capture mode is set as the operation mode 422 of the positioning unit 360 but a satellite capturing operation is not in the middle of the process, the operation control unit 340 stops the supply of power to the positioning unit 360 when a power operation for turning the power of the imaging apparatus 100 off is performed.

FIG. 7B shows a case where the ephemeris data acquiring mode is set as the operation mode 422 of the positioning unit 360. As above, in a case where the ephemeris data acquiring mode is set, as denoted by an arrow 433, when a power operation for turning off the power of the imaging apparatus 100 is performed, the use determining unit 330 determines whether or not the positioning unit 360 is necessary. In this case, similarly to the case shown in FIG. 7A, the position measurement information acquired by the positioning unit 360 is not used. Accordingly, the use determining unit 330 outputs the result of the determination indicating that the position measurement information acquired by the positioning unit 360 is not used to the operation control unit 340.

In addition, similarly to the case shown in FIG. 7A, the operation control unit 340 determines whether or not the supply of power to the positioning unit 360 is necessary based on the operation mode of the positioning unit 360. Here, since the ephemeris data acquiring mode is set as the operation mode 422 of the positioning unit 360, the operation control unit 340 continues to supply the power until the ephemeris data acquiring operation is completed. Then, when the ephemeris data acquiring operation is completed, as denoted by an arrow 434, the operation control unit 340 stops the supply of power to the positioning unit 360. In addition, it may be configured that, when the ephemeris data acquiring operation is completed, whether or not a power operation for turning on the power of the imaging apparatus 100 is performed is determined, and the supply of power to the positioning unit 360 is continued in a case where the power operation for turning the power on is performed. In such a case, the positioning unit 360 transits to the satellite capture mode and performs an intermittent operation in the satellite capture mode.

FIG. 7C shows a case where the position update mode is set as the operation mode 422 of the positioning unit 360. As above, in a case where the position update mode is set, as denoted by an arrow 435, when a power operation for turning off the power of the imaging apparatus 100 is performed, the use determining unit 330 determines whether or not the positioning unit 360 is necessary. In this case, similarly to the case shown in FIG. 7A, the position measurement information acquired by the positioning unit 360 is not used. Accordingly, the use determining unit 330 outputs the result of the determination indicating that the position measurement information acquired by the positioning unit 360 is not used to the operation control unit 340.

In addition, the operation control unit 340, similarly to the case shown in FIG. 7A, determines whether or not the supply of power to the positioning unit 360 is necessary based on the operation mode of the positioning unit 360. Here, since the position update mode is set as the operation mode 422 of the positioning unit 360, the operation control unit 340, as denoted by an arrow 436, stops the supply of power to the positioning unit 360.

Figure 8A:
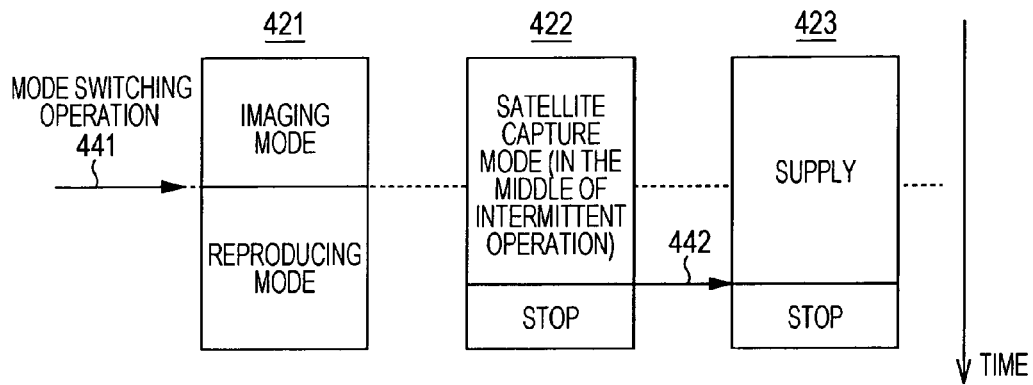
FIGS. 8A to 8C are sequence charts showing cases where the operation of a positioning unit is controlled by an operation control unit according to the first embodiment of the present invention.
Figure 8B:
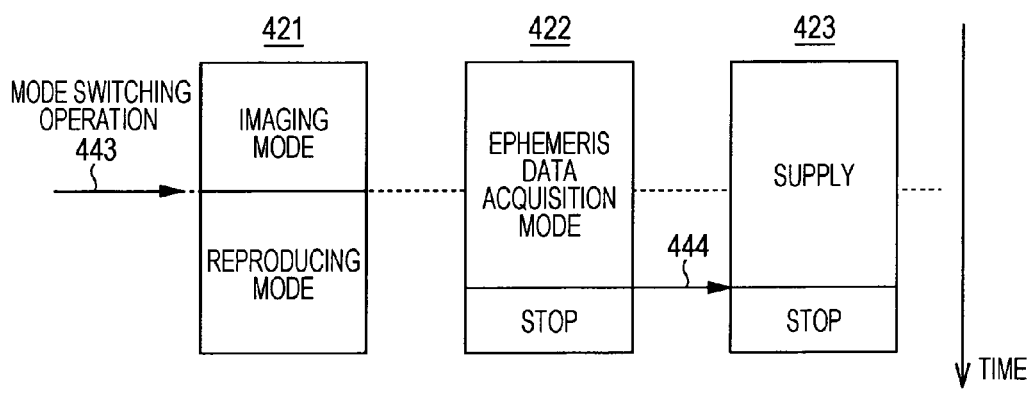
Figure 8C:
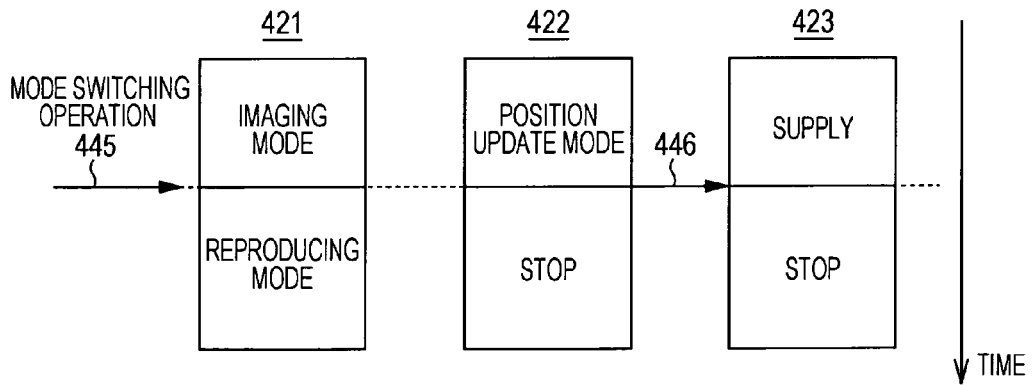

In the example shown in FIGS. 8A to 8C, a case where a switching operation for switching from the photographing mode to the reproducing mode is performed in a case where the photographing mode is set will be assumed and described. In the example shown in FIGS. 8A to 8C, since the photographing mode is set, it is assumed that power is supplied to the positioning unit 360 from the power supply unit 350.

FIG. 8A shows a case where the satellite capture mode is set as the operation mode 422 of the positioning unit 360, and a satellite capturing operation in the satellite capture mode is in the middle of the process. As above, in a case where a switching operation for switching the operation mode from the photographing mode to the reproducing mode is performed in the middle of the satellite capturing operation, as denoted by an arrow 441, the use determining unit 330 determines whether or not the positioning unit 360 is necessary. In this reproducing mode, similarly to the case shown in FIG. 7A, the position measurement information acquired by the positioning unit 360 is not used. Accordingly, the use determining unit 330 outputs the result of the determination indicating that the position measurement information acquired by the positioning unit 360 is not used to the operation control unit 340.

In addition, similarly to the case shown in FIG. 7A, the operation control unit 340 determines whether or not the supply of power to the positioning unit 360 is necessary based on the operation mode of the positioning unit 360. Here, since the satellite capture mode is set as the operation mode 422 of the positioning unit 360, and the satellite capturing operation is in the middle of the process in the satellite capture mode, the operation control unit 340 continues to supply the power until the satellite capturing operation is completed. Then, when the satellite capturing operation is completed, as denoted by an arrow 442, the operation control unit 340 stops the supply of power to the positioning unit 360. In addition, similarly to the case shown in FIG. 7A, it may be configured that the positioning unit 360 determines whether or not acquisition criteria for acquiring the ephemeris data are satisfied, and when the acquisition criteria are satisfied, an ephemeris data acquiring operation in the ephemeris data acquiring mode is performed.

In addition, similarly to the case shown in FIG. 7A, when the satellite capturing operation is completed, and the ephemeris data acquiring operation is completed, it is determined whether or not a switching operation for switching the operation mode from the reproducing mode to the photographing mode is performed. In a case where this switching operation is performed, the supply of power to the positioning unit 360 may be continued. In such a case, the positioning unit 360 transits to the satellite capture mode and performs an intermittent operation in the satellite capture mode.

In addition, in a case where the satellite capture mode is set as the operation mode 422 of the positioning unit 360 but a satellite capturing operation is not in the middle of the process, the operation control unit 340 stops the supply of power to the positioning unit 360 when switching from the photographing mode to the reproducing mode is performed.

FIG. 8B shows a case where the ephemeris data acquiring mode is set as the operation mode 422 of the positioning unit 360. As above, in a case where the ephemeris data acquiring mode is set, as denoted by an arrow 443, when a switching operation for switching the operation mode from the photographing mode to the reproducing mode is performed, the use determining unit 330 determines whether or not the positioning unit 360 is necessary. In this case, similarly to the case shown in FIG. 7B, the position measurement information acquired by the positioning unit 360 is not used. Accordingly, the use determining unit 330 outputs the result of the determination indicating that the position measurement information acquired by the positioning unit 360 is not used to the operation control unit 340.

In addition, similarly to the case shown in FIG. 7B, the operation control unit 340 determines whether or not the supply of power to the positioning unit 360 is necessary based on the operation mode of the positioning unit 360. Here, since the ephemeris data acquiring mode is set as the operation mode 422 of the positioning unit 360, the operation control unit 340 continues to supply the power until the ephemeris data acquiring operation is completed. Then, when the ephemeris data acquiring operation is completed, as denoted by an arrow 444, the operation control unit 340 stops the supply of power to the positioning unit 360. In addition, it may be configured that, when the ephemeris data acquiring operation is completed, whether or not a switching operation for switching the operation mode from the reproducing mode to the photographing mode is performed is determined, and the supply of power to the positioning unit 360 is continued in a case where the power operation for turning the power on is performed. In such a case, the positioning unit 360 transits to the satellite capture mode and performs an intermittent operation in the satellite capture mode.

FIG. 8C shows a case where the position update mode is set as the operation mode 422 of the positioning unit 360. As above, in a case where the position update mode is set, as denoted by an arrow 445, when a switching operation from the photographing mode to the reproducing mode is performed, the use determining unit 330 determines whether or not the positioning unit 360 is necessary. In this case, similarly to the case shown in FIG. 7C, the position measurement information acquired by the positioning unit 360 is not used. Accordingly, the use determining unit 330 outputs the result of the determination indicating that the position measurement information acquired by the positioning unit 360 is not used to the operation control unit 340.

In addition, the operation control unit 340, similarly to the case shown in FIG. 7C, determines whether or not the supply of power to the positioning unit 360 is necessary based on the operation mode of the positioning unit 360. Here, since the position update mode is set as the operation mode 422 of the positioning unit 360, the operation control unit 340, as denoted by an arrow 446, stops the supply of power to the positioning unit 360.

In addition, a case where a switching operation for switching the operation mode from the photographing mode to the communication mode or the various setting mode is similar to the case where a switching operation for switching the operation mode from the photographing mode to the reproducing mode shown in FIGS. 8A to 8C. Thus, the description thereof is omitted here.

Example of Operation of Imaging Apparatus

FIG. 9 is a flowchart showing an example of the processing sequence of the positioning process performed by the imaging apparatus 100 according to the first embodiment of the present invention. In this example, a case where the position acquisition/power consumption balanced mode is set by pressing the "position acquisition/power consumption balanced mode" button 402 on the position acquiring mode designating screen 400 shown in FIG. 6 will be described as an example.

For example, when an operation input for turning on the power of the imaging apparatus 100 is received from a user operation, the host system is started. Then, in a case where a switching operation for switching the operation mode from a mode other than the photographing mode to the photographing mode is received, or when the host system is started in the photographing mode (Step S900), the operation mode of the GPS module 120 is determined (Step S901). In other words, the host control unit 130 determines the operation mode of the GPS module 120 by transmitting a command used for checking the operation mode of the GPS module 120 to the GPS control section 121. In addition, it may be configured that the state of the GPS module 120 is included in the position measurement information regularly transmitted from the GPS module 120, and the operation mode of the GPS module 120 is determined based on state of the GPS module 120. In other words, the operation mode of the GPS module 120 can be determined by opening a reception port of the host control unit 130 using the signal line 210 and reading the received data. In a case where there is no reception data, the GPS module 120 can be determined to be in the OFF state. Here, in the first embodiment of the present invention, even in a state in which the host control unit 130 side power of the imaging apparatus 100 is turned off, there is a case where the power of the GPS module 120 is turned on. Accordingly, immediately after the operation input for turning on the power of the imaging apparatus 100 is received, the operation mode of the GPS module 120 is determined.

In a case where the operation mode of the GPS module 120 is the satellite capture mode (Step S901), a satellite capturing operation is continuously performed for a regulated time (Step S923). In addition, in a case where the operation mode of the positioning unit 360 is the ephemeris data acquiring mode (denoted by "Eph. acquiring mode" in FIG. 9) (Step S901), an ephemeris data acquiring operation is continuously performed (Step S926). In a case where the GPS module 120 is in the power-off state (Step S901), the power control logic circuit 122 starts the supply of power from the battery 200 to the GPS module 120 (Step S902).

Subsequently, the GPS module 120 performs an intermittent operation in the satellite capture mode (Step S903). This intermittent operation is performed for a time for which a GPS satellite can be specified (for example, 18 seconds) in the state in which the GPS module 120 is in the ON state. For example, it may be configured that the execution state of the satellite capturing operation lasts for 18 seconds, and the off-state of the satellite capturing operation lasts for 72 seconds.

Subsequently, it is determined whether or not the GPS module 120 maintains the ephemeris data (Step S904). In a case where the GPS module 120 maintains the ephemeris data (Step S904), it is determined whether or not the maintained ephemeris data is valid ephemeris data (Step S905). In a case where the maintained ephemeris data is valid ephemeris data (Step S905), it is determined whether or not there is ephemeris data sufficient for position measurement for the maintained ephemeris data (Step S906). For example, in the position measurement, it is necessary to capture four or more satellites. Accordingly, it is determined whether or not four or more satellites can be captured based on the maintained ephemeris data.

In a case where there is ephemeris data sufficient for position measurement (Step S906), it is determined whether or not a new satellite is seen (Step S907). When a new satellite is not seen (Step S907), the GPS module 120 performs an intermittent operation in the position update mode (Step S908). For example, it may be configured that the execution state of the position update operation lasts for 3 seconds, and the off-state of the position update operation lasts for 12 seconds.

Subsequently, it is determined whether or not the ephemeris data maintained by the GPS module 120 is ephemeris data that is sufficient for position measurement and valid (Step S909). Then, while the maintained ephemeris data is ephemeris data that is sufficient for position measurement and valid, an intermittent operation in the position update mode is continuously performed (Step S908). Here, "while the maintained ephemeris data is ephemeris data that is sufficient for position measurement and valid", for example, represents a period during which the maintained ephemeris data at the current situation corresponds to the number of GPS satellites sufficient for position measurement and is within an effective period.

On the other hand, in a case where the GPS module 120 does not maintain the ephemeris data (Step S904), or in a case where the maintained ephemeris data is not valid ephemeris data (Step S905), the process proceeds to Step S910. In addition, in a case where there is no ephemeris data sufficient for position measurement (Step S906) or in a case where a new satellite is seen (Step S907) when positioning is performed for the maintained ephemeris data, the process proceeds to Step S910.

Then, the GPS module 120 determines whether or not the acquisition criteria for acquiring ephemeris data are satisfied (Step S910). When the acquisition criteria are satisfied (Step S910), the GPS module 120 performs an ephemeris data acquiring operation in the ephemeris data acquiring mode (Step S911). This ephemeris data acquiring operation, for example, is completed when sufficient ephemeris data is acquired or the completion conditions are satisfied. For example, an elapse of set time or continuous non satisfaction of the criteria may be used as the completion conditions. Then, when the ephemeris data acquiring operation (Step S911) is completed, the process is returned back to Step S903. When the acquisition criteria for acquiring ephemeris data are not satisfied (Step S910), the process is retuned back to Step S903. In this example, a case where the process proceeds to Step S911 in a case where the acquisition criteria for acquiring the ephemeris data are satisfied in Step S910 is represented as an example. However, when the process proceeds to Step S910 through Step S907, there is sufficient ephemeris data. Accordingly, in a case where the process proceeds to Step S910 through Step S907, the process may be configured to proceed to Step S908.

Here, the processing sequence represented in a dotted rectangle is the processing sequence of an interrupt process 800. In this example, a case where a user operation for turning off the power of the imaging apparatus 100 or a switching operation for switching the operation mode to a mode other than the photographing mode is used as a trigger for performing an interrupt process will be described as an example.

When an operation input for turning off the power of the imaging apparatus 100 or a switching operation for switching the operation mode to a mode other than the photographing mode is received (Step S920), the power of the host-side imaging apparatus 100 is turned off, and the GPS module 120 is notified of the power-off of the host side. Here, Step S920 is an example of a determination sequence according to an embodiment of the present invention. When the power-off of the host-side is notified of, the operation mode at the time of the notification is checked by the GPS module 120 (Step S921). In a case where the operation mode at the time of the notification is the ephemeris data acquiring mode (Step S921), the ephemeris data acquiring operation is continued to be performed (Step S926). On the other hand, in a case where the operation mode at the time of the notification is the position update mode (Step S921), the power of the GPS module 120 is turned off (Step S927). In other words, the GPS module 120 notifies the power control logic circuit 122 of power-off, and the power control logic circuit 122 stops the supply of power to the GPS module 120 (Step S927). In addition, in a case where the operation mode at the time of the notification is the satellite capture mode (Step S921), it is determined whether or not the GPS module 120 is in the middle of performing a satellite capturing operation in the satellite capture mode (Step S922).

In a case where the satellite capturing operation is in the middle of the process in the satellite capture mode (Step S922), the GPS module 120 continues to perform the satellite capturing operation for a regulated time (Step S923). Then, the GPS module 120 determines whether or not acquisition criteria for acquiring ephemeris data are satisfied (Step S924). The acquisition criteria may be the same as the acquisition criteria in Step S910.

When the acquisition criteria are satisfied (Step S924), the GPS module 120 performs the ephemeris data acquiring operation in the ephemeris data acquiring mode (Step S926). This ephemeris data acquiring operation, for example, is completed in a case where sufficient ephemeris data is acquired or in a case where the completion conditions are satisfied. These completion conditions may be set to be the same as the completion conditions in Step S911. Then, when the ephemeris data acquiring operation (Step S926) is completed, the process proceeds to Step S925. On the other hand, when the acquisition criteria for acquiring the ephemeris data are not satisfied (Step S924), the process proceeds to Step S925.

Subsequently, the GPS module 120 checks the host-side state of the imaging apparatus 100 (Step S925). In a case where the state of the power of the host side is ON, and the photographing mode is set (Step S925), the process is returned back to Step S903. On the other hand, in a case where the state of the power of the host side is OFF or a mode other than the photographing mode is set (Step S925), the power of the GPS module 120 is turned off (Step S927). Accordingly, the power of the host side and the GPS side is in the OFF state. Here, Steps S921 to S926 are an example of a control sequence according to an embodiment of the present invention.

Here, in Step S927, a case where acquisition of ephemeris data is incomplete may be considered. Accordingly, in Step S927, it may be configured that, before the power of the GPS module 120 is turned off, an intermittent operation in a satellite capture mode is performed a predetermined number of times or for a predetermined time, and, after the satellite capture intermittent operation is performed, the power of the GPS module 120 is turned off. This example is shown in FIG. 10.

Figure 10:
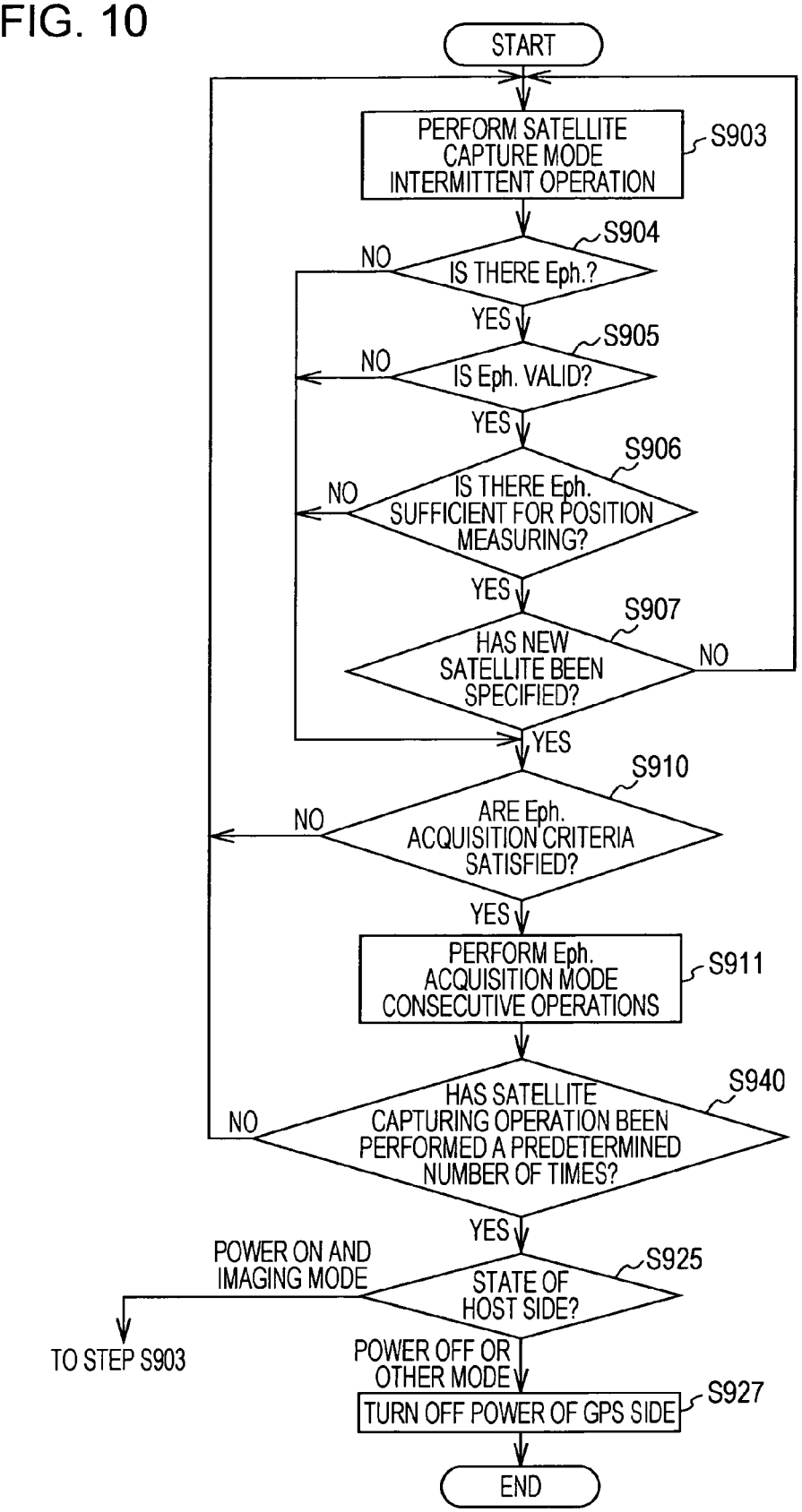
FIG. 10 is a flowchart showing an example of the processing sequence of a positioning process performed by the imaging apparatus according to the first embodiment of the present invention.

FIG. 10 is a flowchart showing an example of the processing sequence of a positioning process performed by the imaging apparatus 100 according to the first embodiment of the present invention. This processing sequence is a modified example of Step S927 shown in FIG. 9 and is an example in which, before the power of the GPS module 120 is turned off, the intermittent operation in the satellite capture mode is performed a predetermined number of times. In the processing sequence shown in FIG. 10, the same reference numeral is assigned to the same processing sequence as that shown in FIG. 9, and the description thereof is omitted.

In Step S925 shown in FIG. 9, when the state of the power of the host side of the imaging apparatus 100 is in the OFF state, or when a mode other than the photographing mode is set (Step S925), the intermittent operation in the satellite capture mode is performed a predetermined number of times. In other words, Steps S903 to S907, S910, and S911 shown in FIG. 9 are performed a predetermined number of times. Then, when Steps S903 to 5907, S910, and 5911 are performed a predetermined number of times (Step S940), the process proceeds to Step S925. In addition, in this example, a case where the intermittent operation in the satellite capture mode is performed a predetermined number of times is shown as an example. However, in Step S940, it may be determined whether or not the intermittent operation in the satellite capture mode is performed a predetermined number of times.

Accordingly, even when the power of the host side of the imaging apparatus 100 is in the OFF state, or when a mode other than the photographing mode is set, the ephemeris data can be acquired, and accordingly, position measurement can be performed in a speedy manner at the next time and thereafter. In addition, whether or not the processing sequence shown in FIG. 10 is performed and the number of times or execution time of performing the intermittent operation in the satellite capture mode in the case where the processing sequence shown in FIG. 10 is performed may be configured to be settable. Accordingly, a user setting can be performed in consideration of power consumption.

In addition, in the first embodiment of the present invention, an example in which a user operation for turning off the power of the imaging apparatus 100 or a switching operation for switching the operation mode to a mode other than the photographing mode is used as a trigger for performing the interrupt process is shown. However, for example, a case where the imaging apparatus 100 is in the standby state (waiting state) may be used as a trigger for performing the interrupt process. In other words, in a case where the photographing mode is set, when the state of the imaging apparatus 100 changes to be in the standby state may be used as a trigger for performing the interrupt process.

In addition, in a case where the user operation for turning off the power of the imaging apparatus 100 is performed, and the interrupt process is performed, the power of the host side of the imaging apparatus 100 may be in the OFF state. In such a case, a notification unit that notifies the user that the GPS module 120 is in the middle of the operation may be externally mounted in the imaging apparatus 100. This notification unit, for example, performs a notification process for the user under the control of the GPS module 120. As this notification unit, for example, an LED (Light Emitting Diode) is disposed on the side face of the imaging apparatus 100, and the LED may be allowed to emit light under the control of the GPS module 120. Accordingly, after a power-off operation is performed, the user can be notified that the GPS module 120 is in the middle of the operation.

As above, for example, in a case where power on/off operations of the imaging apparatus 100 are repeatedly performed, even after the main power of the imaging apparatus 100 is turned off, the operation of the GPS module 120 may be continued to be performed as is necessary. Accordingly, at the time of the next startup, the GPS module 120 can perform a hot start with high probability. Thus, the positioning process can be performed in a speedy manner.

In addition, under an environment in which it is difficult to find a GPS satellite, even after the main power of the imaging apparatus 100 is turned off, in a case where the intermittent operation in the satellite capture mode is performed at the time of turning the power off, satellite searching is continued to be performed until the operation is completed. Then, in a case where a GPS satellite is found in the middle of the operation, an ephemeris data acquiring operation can be continuously performed. Accordingly, at the next startup, the GPS module 120 can perform a hot start, whereby the positioning process can be performed in a speedy manner.

In addition, in a case where a mode (the reproducing mode, the communication mode, or the like), in which the position measurement information acquired by the GPS module 120 is not necessary, is set, the GPS module 120 can be in the OFF state. Accordingly, the power consumption can be reduced.

In addition, even in the state in which a GPS satellite is not found, the intermittent operation for satellite capturing is performed in the satellite capture mode. Accordingly, when the user moves to an environment in which ephemeris data can be acquired while suppressing the power consumption, the operation can quickly transit to acquisition of the positional information.

In addition, since an intermittent operation is performed in the position update mode, appropriate position update can be performed while suppressing the power consumption. In addition, even in a case where the user moves to a situation in which a GPS is not seen during the intermittent operation in the position update mode, the same operation is continued. Accordingly, when the user moves to a position in which positioning can be performed, update of the position can be performed in a speedy manner.

In addition, in a case where a mode (the satellite capture mode or the position update mode) other than the ephemeris data acquiring mode is set, an intermittent operation is performed, and accordingly, the power consumption can be suppressed.

In addition, by appropriately changing the operation duty at the time of performing the intermittent operation, the power assigned to the GPS module 120 can be decreased. Accordingly, the GPS module 120 can be relatively easily built in a system having tight battery capacity or power consumption.

In addition, in a case where the power of the GPS module 120 is turned off, the state of the host side of the imaging apparatus 100 is checked. Accordingly, the GPS module 120 can be mounted without its operation being stopped.

As above, according to the first embodiment of the present invention, the power consumption of the imaging apparatus 100 is decreased, and appropriate positing can be performed by using the GPS module 120.

2. Second Embodiment

In the first embodiment of the present invention, an example in which the power of the GPS control section is turned off during the interval of the intermittent operations is represented. However, during the interval of the intermittent operations, the GPS control section may be in the standby state without turning off the power of the GPS control section. Thus, in the second embodiment of the present invention, a case where the GPS control section is in the standby state during the interval of the intermittent operations will be described as an example.

Configuration Example of GPS Module

Figure 11:
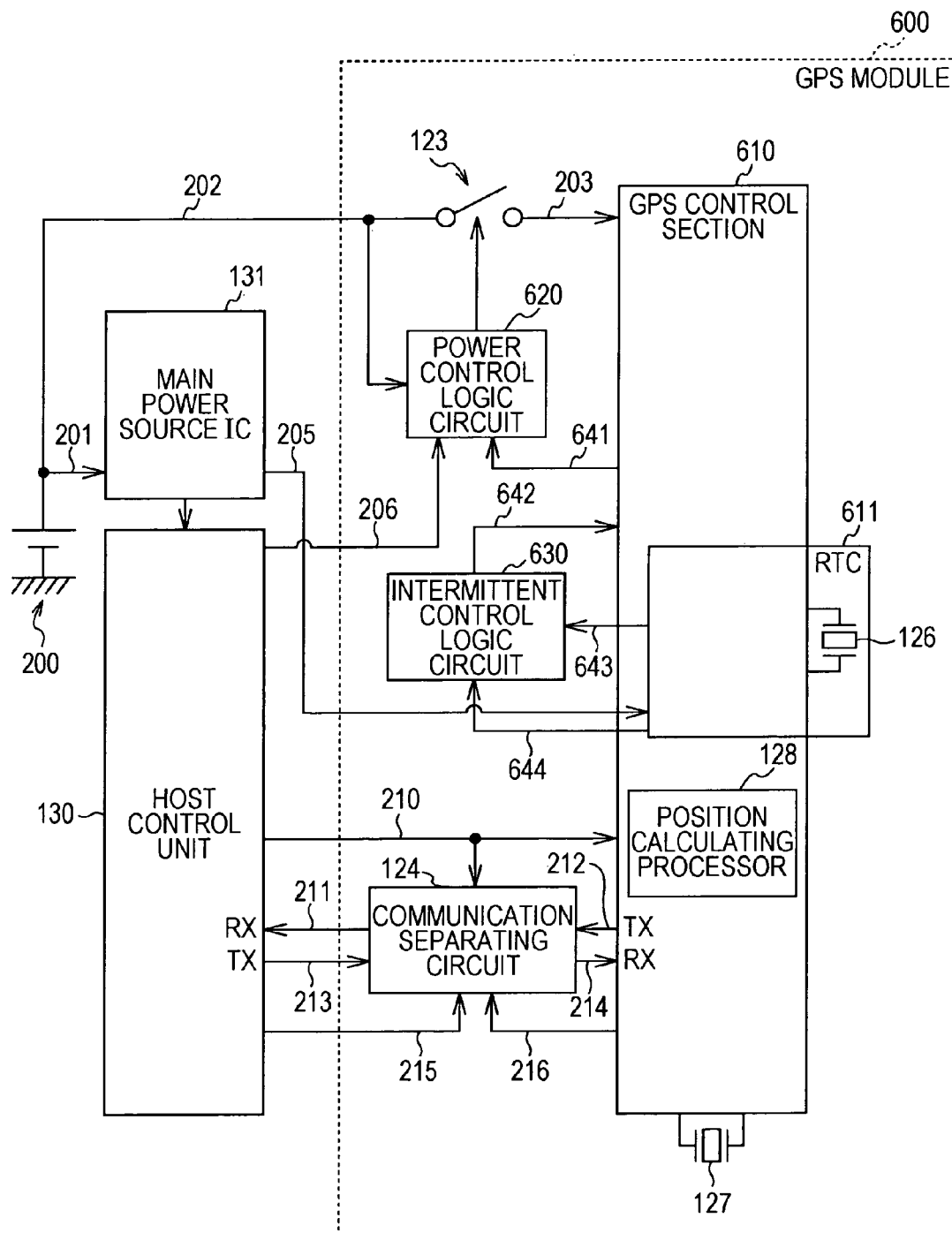
FIG. 11 is a diagram showing an example of the internal configuration of a GPS module according to the second embodiment of the present invention.

FIG. 11 is a diagram showing an example of the internal configuration of a GPS module 600 according to the second embodiment of the present invention. The example shown in FIG. 11 is a modified example of the GPS module 120 or the host control unit 130 shown in FIG. 3, and the units are partially modified. Thus, hereinafter, differences from the GPS module 120 or the host control unit 130 shown in FIG. 3 will be focused in the description. In addition, the same reference numeral is assigned to common parts, and the description thereof is partially omitted.

FIGS. 12A and 12B are diagrams schematically representing the control content of a power control logic circuit 620 according to the second embodiment of the present invention. The control content of the power control logic circuit 620 shown in FIGS. 12A and 12B will be described in detail with reference to FIG. 11.

In the GPS module 600, an intermittent control logic circuit 630 is added to the GPS module 120 shown in FIG. 3, and, instead of the power control logic circuit 122, a power control logic circuit 620 is disposed. In addition, the GPS module 600 includes a GPS control section 610, the power control logic circuit 620, the intermittent control logic circuit 630, a power switch 123, and a communication separating circuit 124.

The GPS control section 610 is a control circuit that controls the GPS module 600, and an RTC 611 and a position calculating processor 128 are built therein. The GPS control section 610 outputs a control signal to the power control logic circuit 620 from a GPS power-on control port through a signal line 641. The control signal output through the signal line 641 is a control signal indicating whether or not the host control unit 130 demands startup of the GPS module 120 and can be output at the same timing as that of a control signal output from the RTC 611 through a signal line 644. However, differently from the host side, not a trigger but a control signal of the "H" level is continuously output until power off of the GPS side is determined.

The power control logic circuit 620 is a circuit that is responsible for ON/Off of the power of the GPS control section 610 and is, for example, configured by a discrete semiconductor and a linear IC. More specifically, the power control logic circuit 620 controls ON/OFF of the power of the GPS control section 610 based on a control signal output from the host control unit 130, a control signal output from the GPS control section 610, and voltage monitoring of the battery 200. More specifically, the description will be presented with reference to FIG. 12A. For example, a case where the supply voltage of the power supply line 202 is within the operating assurance voltage range of the GPS control section 610 will be assumed. In such a case, the power control logic circuit 620 outputs a control signal of the "H" level to the power switch 123 when a control signal of the "H" level is output from at least one of the host control unit 130 and the GPS control section 610. Accordingly, the power of the GPS control section 610 is turned on. On the other hand, for example, in a case where the supply voltage supplied through the power supply line 202 is beyond the operation assurance voltage range of the GPS control section 610, the power control logic circuit 620 outputs a control signal of the "L" level to the power switch 123 regardless of the control signals of the host control unit 130 and the GPS control section 610. Accordingly, the power of the GPS control section 610 is forcedly turned off.

The intermittent control logic circuit 630 is a circuit that allows the GPS control section 610 to be in the ON state or the standby state. More specifically, the intermittent control logic circuit 630 controls the GPS control unit 610 to be in the ON state or the standby state based on an intermittent operation time control signal output from the RTC 611 and a control signal output from the RTC 611. For example, the intermittent control logic circuit 630 allows the GPS control section 610 to be in the ON state by the interrupt process by switching the control signal output through the signal line 642 from the "L" level to the "H" level. In addition, for example, the intermittent control logic circuit 630 allows the GPS control section 610 to be in the standby state by the interrupt process by switching the control signal output through the signal line 642 from the "H" level to the "L" level.

The control signal output from the RTC 611 is a control signal that represents whether or not the host control unit 130 demands start-up of the GPS module 600 and is input through a signal line 644. This control signal, for example, similarly to the control signal output through the signal line 207 shown in FIG. 3, may be a control signal of the "H" level and the "L" level. This control signal is generated based on a notification from the host control unit 130 that is input through a signal line 210. In addition, similarly to FIG. 3, for example, it can be used whether or not there is an output from a 32k_out terminal. According to this control signal, an unintentional temporary control signal of the "H" level can be blocked in a case where the timer count bits are full.

In addition, the intermittent operation time control signal output from the RTC 611 is a control signal representing the content of the operation of the GPS module 600 and is input through a signal line 643. This intermittent operation time control signal, for example, similarly to the intermittent operation time control signal shown in FIG. 3, may be a control signal of the "H" level and the "L" level. An example of the relationship of the control signals (the signal lines 643 and 644) and the control signal that is output from the intermittent control logic circuit 630 through the signal line 642 is shown in FIG. 12B.

As above, during the interval of the intermittent operations of the GPS module 600, the GPS control section 610 can be allowed to be in the standby state. In addition, in FIG. 11, power may be configured to be supplied to the GPS control section 610 all the time by omitting inputs of the control signals from the host control unit 130 and the GPS control section 610 so as to configure the input to the power control logic circuit 620 by using only the voltage monitoring of the battery 200. Even in such a case, since the GPS control section 610 can be allowed to be in the ON state or the standby state by the intermittent control logic circuit 630, the power consumption can be reduced. The intermittent control logic circuit 630 is an example of a switching unit (a switching unit that switches between On/Standby in accordance with the control signal line) according to an embodiment of the present invention. The standby state of the GPS control section 610 is an example of the second mode according to an embodiment of the present invention.

3. Third Embodiment

In the first embodiment of the present invention, an example in which the ephemeris data is extracted from a navigation message that is acquired from a GPS satellite, and position measurement is performed by using the extracted ephemeris data is shown. Here, in the position measurement using the GPS, positioning can be performed by using predicted ephemeris data. The predicted ephemeris data described here represents data that is calculated as a satellite orbit predicted in the future based on the ephemeris data (including data acquired in the past) inside the navigation message transmitted from the GPS satellite. Thus, in the third embodiment of the present invention, a case where position measurement is performed by using the predicted ephemeris data together with the ephemeris data extracted from the navigation message will be described as an example. In addition, the predicted ephemeris data, as described above, is data that is generated based on the ephemeris data extracted from the navigation message, and for example, the predicted ephemeris data is generated based on the ephemeris data in the past. For example, as a method of acquiring the predicted ephemeris data, an acquisition method in which predicted ephemeris data generated in advance is acquired by being downloaded into the imaging apparatus 100 from the outside via a network (wired or wireless) or a recording medium can be used. In addition, the host control unit 130 or the GPS control section 121 may calculate the predicted ephemeris data based on the ephemeris data that is received by the imaging apparatus 100 from the GPS satellite for acquiring the ephemeris data. The configuration according to the third embodiment of the present invention is approximately the same as that according to the first embodiment of the present invention. Thus, hereinafter, differences will be focused in the description, and the same reference numeral is assigned to common parts, and the description thereof is partially omitted.

Example of Display of Position Acquiring Mode on Designated Screen

Figure 13:
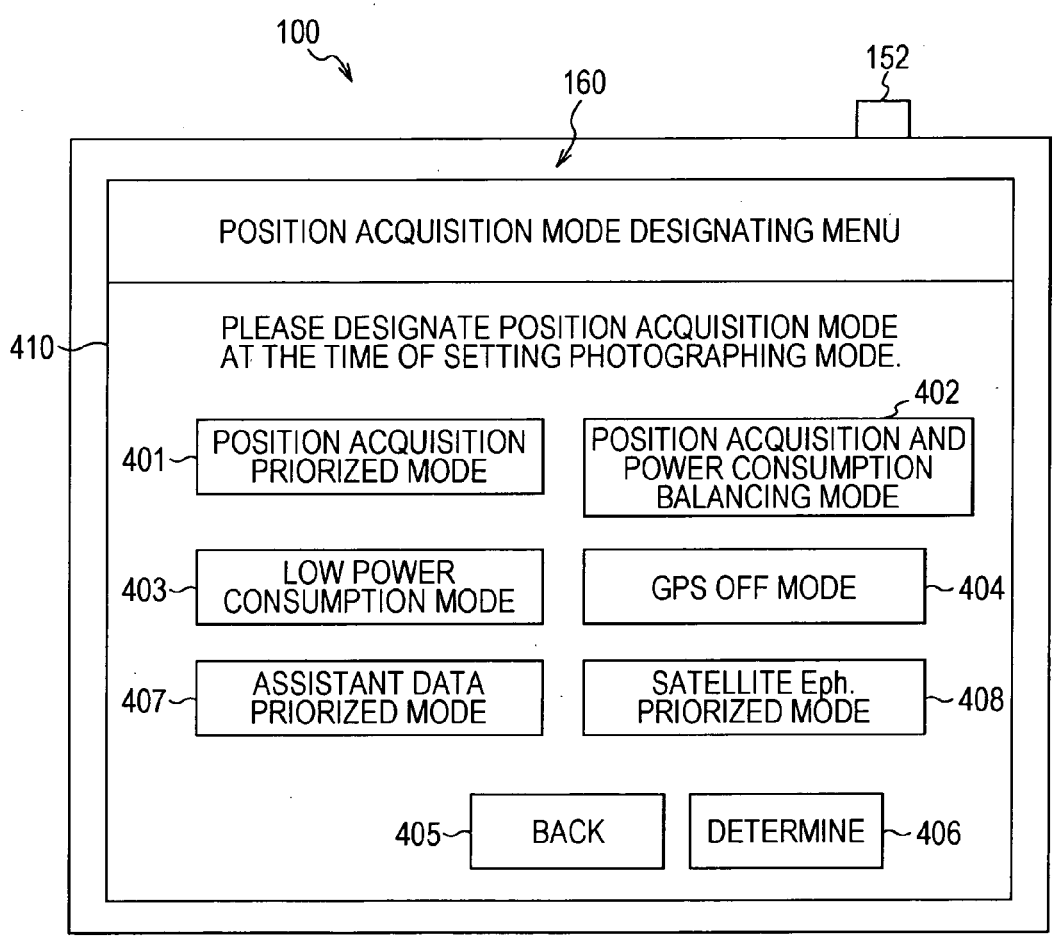
FIG. 13 is a diagram representing a display example of a display unit according to the third embodiment of the present invention.

FIG. 13 is a diagram representing a display example (a position acquiring mode designating screen 410) of a display unit 160 according to the third embodiment of the present invention. The position acquiring mode designating screen 410 is a modified example of the position acquiring mode designating screen 400 shown in FIG. 6 and is a screen that is used for designating the position acquiring mode when the photographing mode is set. Accordingly, the same reference numeral is assigned to common parts that are common to the position acquiring mode designating screen 400, and the description thereof is omitted.

On the position acquiring mode designating screen 410, an "assistance data prioritized mode" button 407 and a "predicted Eph. prioritized mode" button 408 are disposed.

The "assistance data prioritized mode" button 407 is a button that is pressed in a case where an assistance data prioritized mode is designated. The assistance data prioritized mode is a mode in which an intermittent operation in the position update mode is performed by using data (assistance data) relating to the orbit of the GPS satellite according to time such as the predicted ephemeris data with priority. The assistance data described here may be data predicting the orbit of the GPS satellite at least according to time, and for example, as the assistance data, the above-described predicted ephemeris data may be used. In addition, as the assistance data, for example, data predicting the orbit of the GPS satellite according to time, which is not based on the ephemeris data acquired from the GPS satellite, may be used. The special feature of the assistance data prioritized mode is that the navigation message broadcasted from the GPS satellite is not acquired in a case where there is predicted ephemeris data sufficient for positioning. In addition, the positional information can be acquired although the accuracy of positioning is low and the positioning time is long, compared to a case where the actual ephemeris data is used. Furthermore, the power consumption in the middle of acquisition of the ephemeris data (for example the processing sequence of Step S911 shown in FIG. 14 (the Eph. acquiring mode continuous operation)) can be decreased.

The "satellite Eph. prioritized mode" button 408 is a button that is pressed in a case where a satellite Eph. prioritized mode is designated. The satellite Eph. prioritized mode is a mode in which the ephemeris data broadcasted from the GPS satellite is acquired even in a case where there is the predicted ephemeris data. The processing sequence in a case where the satellite Eph. prioritized mode is set is the same as the processing sequence shown in FIG. 9. However, since there is the predicted ephemeris data, a satellite capture time in the satellite capture mode under an environment in which it is difficult to capture the satellite can be shortened. Accordingly, the number of transitions to the ephemeris data acquiring mode can be increased. In addition, at the time of a cold start or warm start, the positional information can be acquired in a speedy manner based on the predicted ephemeris data. Accordingly, a user's waiting time until the first position measurement after start of use is decreased, whereby stress given to the user can be reduced.

Example of Operation of Imaging Apparatus

Figure 14:
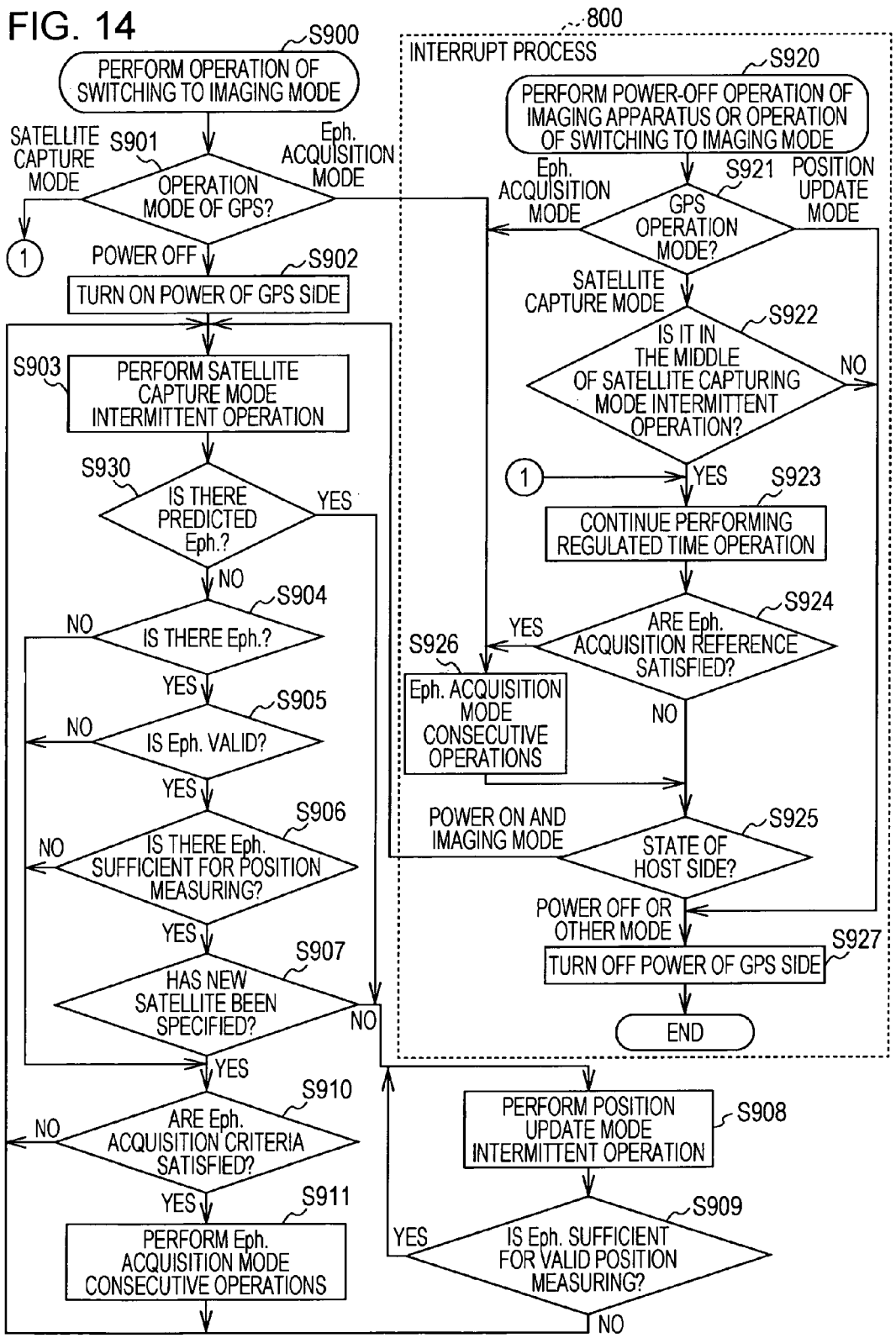
FIG. 14 is a flowchart showing an example of the processing sequence of a positioning process performed by the imaging apparatus according to the third embodiment of the present invention.

FIG. 14 is a flowchart showing an example of the processing sequence of the positioning process performed by the imaging apparatus 100 according to the third embodiment of the present invention. In this example, a case where the assistance data prioritized mode is set by pressing the "assistance data prioritized mode" button 407 on the position acquiring mode designating screen 410 shown in FIG. 13 will be described as an example. The processing sequence shown in FIG. 14 is a modified example of the processing sequence shown in FIG. 9, and there is only a difference in that Step S930 is added. Thus, hereinafter, differences from the processing sequence shown in FIG. 9 will be focused in the description. In addition, the same reference numeral is assigned to common parts, and the description thereof is partially omitted.

After the GPS module 120 performs an intermittent operation in the satellite capture mode (Step S903), it is determined whether or not predicted ephemeris data is maintained in the GPS module 120 (Step S930). In a case where the predicted ephemeris data sufficient for position measurement is maintained in the GPS module 120 (Step S930), the GPS module 120 performs an intermittent operation in the position update mode by using the predicted ephemeris data (Step S908). Even in this case, for example, it may be configured that the execution state of the position updating operation lasts for 3 seconds, and the off-state of the position updating operation lasts for 12 seconds.

In addition, in a case where the predicted ephemeris data sufficient for position measurement is not maintained in the GPS module 120 (Step S930), the process proceeds to Step S904.

4. Modified Examples

In the first to third embodiments of the present invention, examples in which the position calculating processor is built in the GPS control section are shown. However, the position calculating processor may be disposed to the outside of the GPS control section. Thus, hereinafter, an example in which the position calculating processor is disposed outside the GPS control section will be described. Hereinafter, other modified examples of the first to third embodiments of the present invention will be represented. A GPS module or a control unit described below are modified examples of the GPS module 120 or the host control unit 130 shown in FIG. 3, and a part thereof is changed. Thus, hereinafter, differences from the GPS module 120 or the host control unit 130 shown in FIG. 3 will be focused in the description. The same reference numeral is assigned to common parts, and the description thereof is partially omitted.

Configuration Example of GPS Module

Figure 15:
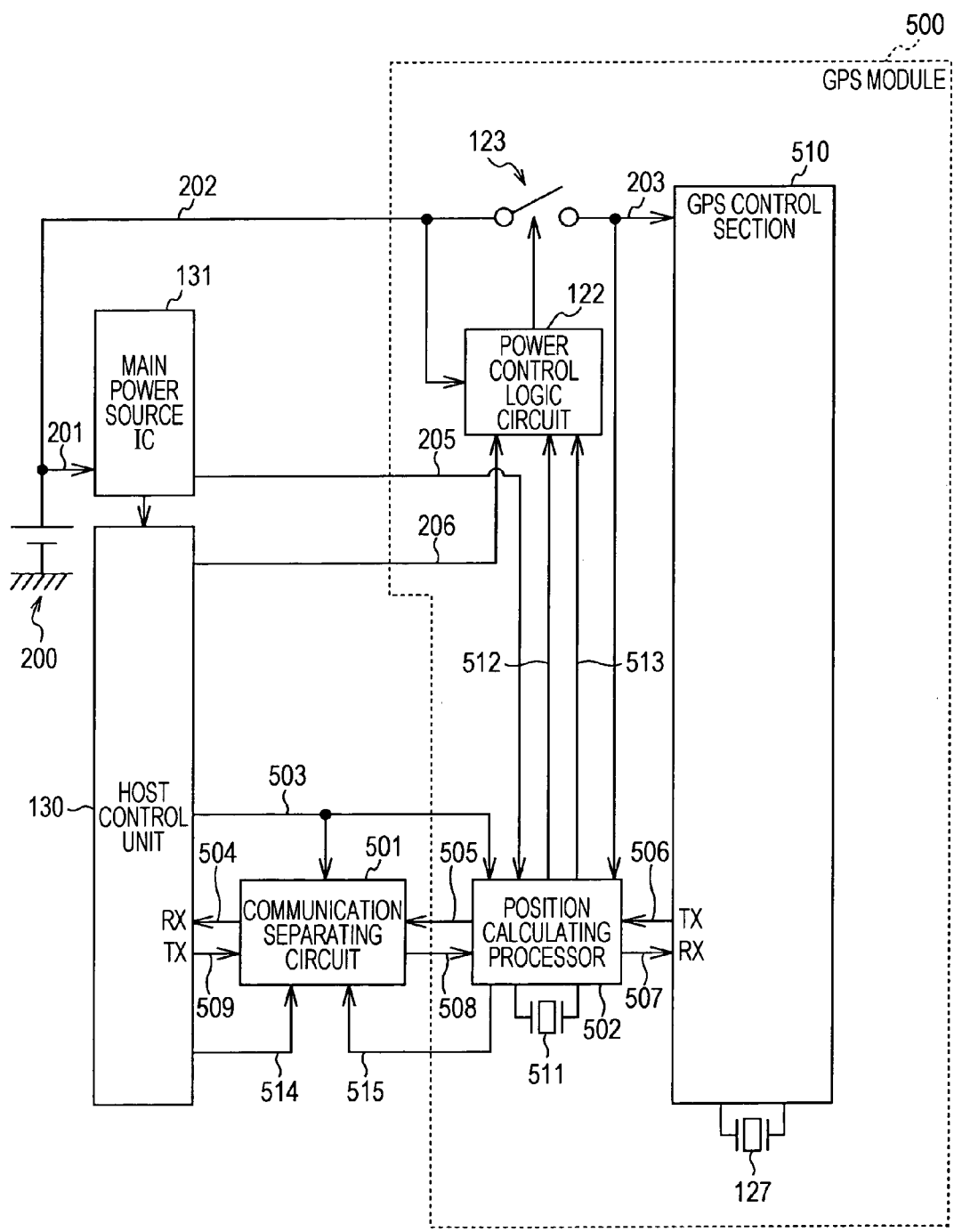
FIG. 15 is a diagram showing an example of the internal configuration of a GPS module according to a modified example of the first embodiment of the present invention.

FIG. 15 is a diagram showing an example of the internal configuration of a GPS module 500 according to a modified example of the first embodiment of the present invention. In the GPS module 500, the position calculating processor 128 built in the GPS control section 121 shown in FIG. 3 is disposed to the outside of the GPS control section 121 inside the GPS module 120. In addition, in the GPS module 500, the communication separating circuit 124 built in the GPS module 120 shown in FIG. 3 is disposed to the outside of the GPS module 120. A GPS control section 510 is a host-based-type GPS IC that, for example, can perform not position calculation but signal capturing from a GPS satellite, reception of a navigation message, and transmission of a decoded navigation message. Accordingly, in the GPS control section 510, it is necessary to externally dispose a processor (for example, a position calculating processor 502) that performs position calculation. According to the position calculating processor 502 that is externally disposed, position calculation can be performed based on the navigation data. In addition, a signal line 512 corresponds to the signal line 207 shown in FIG. 3, a signal line 513 corresponds to the signal line 204 shown in FIG. 3, a signal line 514 corresponds to the signal line 215 shown in FIG. 3, and a signal line 515 corresponds to the signal line 216 shown in FIG. 3. In the position calculating processor 502, an oscillator 511 is disposed.

For example, a command is transmitted from the host control unit 130 to the position calculating processor 502 through signal lines 509 and 508 and a communication separating circuit 501. In addition, a command is transmitted from the position calculating processor 502 to the GPS control section 510 through a signal line 507.

In addition, a navigation message that is received by the GPS control section 510 from the GPS satellite through a signal line 506 and is decoded by the GPS control section 510 is transmitted from the GPS control section 510 to the position calculating processor 502. In addition, the positional information calculated by the position calculating processor 502 is transmitted from the position calculating processor 502 to the host control unit 130 through the signal lines 505 and 504 and the communication separating circuit 501. In addition, a signal line 503 corresponds to the signal line 210 shown in FIG. 3. The position calculating processor 502 may be configured to perform a process other than the position calculation. For example, in a case where the position calculating processor 502 is operated in two states of ON/Standby at the constant power source, the position calculation processor 502 may replace the power control logic circuit.

In addition, in the example shown in FIG. 15, a case in which the position calculating processor is disposed inside the GPS module 500 is represented as an example. However, for example, the position calculating processor may be disposed to the outside of the GPS module 500. For example, a processor that performs position calculation may be disposed in the host control unit 130, and a processor that performs position calculation may be disposed to the outside of the host control unit 130 and the GPS module 500.

Configuration Example of GPS Module

Figure 16:
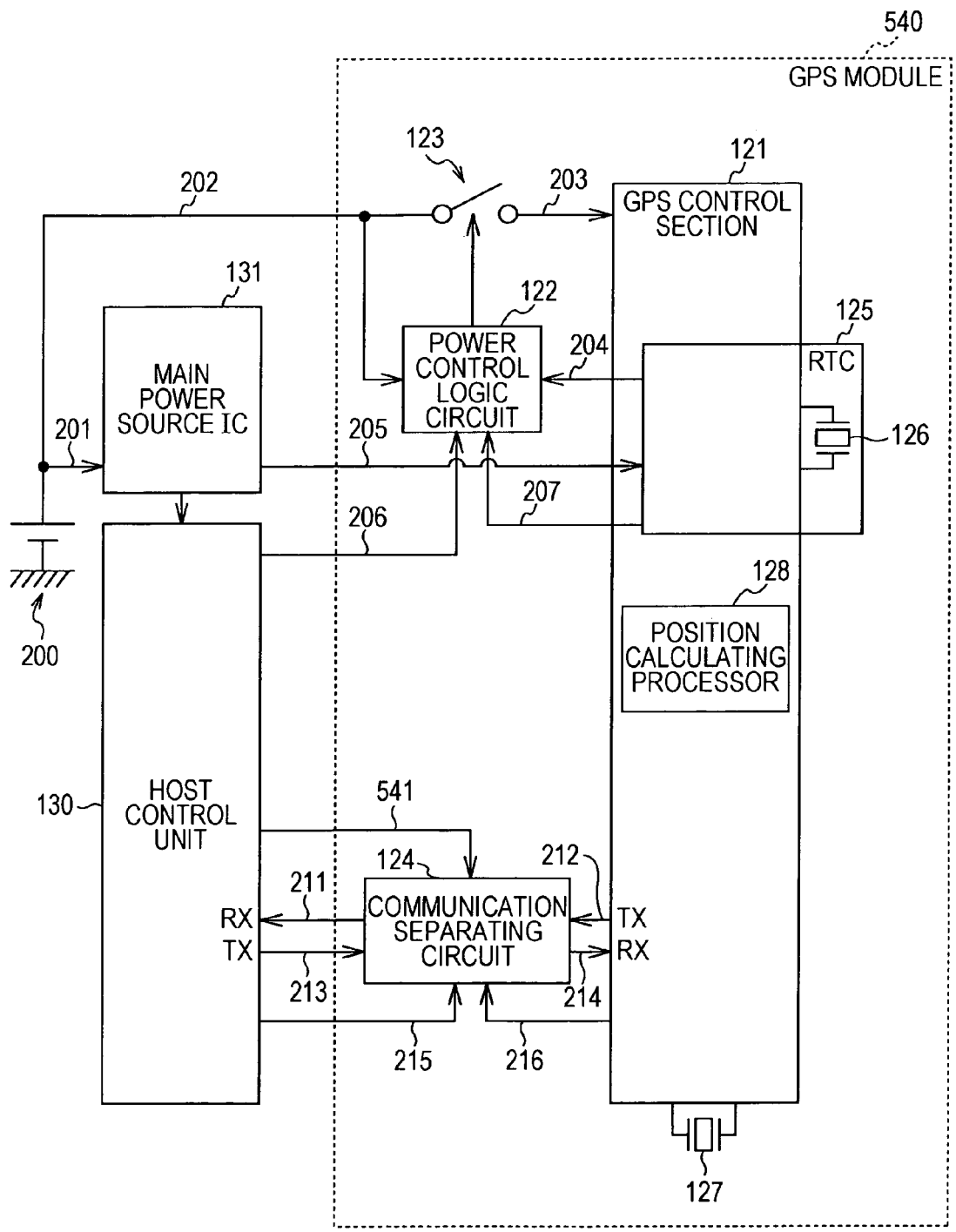
FIG. 16 is a diagram showing an example of the internal configuration of a GPS module according to a modified example of the first embodiment of the present invention.

FIG. 16 is a diagram showing an example of the internal configuration of a GPS module 540 according to another modified example of the first embodiment of the present invention. In the GPS module 540, instead of the signal line 210 disposed in the GPS module 120 shown in FIG. 3, a signal line 541 is disposed. In other words, a control signal that is output from the host-side ready notification port of the host control unit 130 is not input to the host state monitoring port of the GPS control section 121 but input only to the communication separating circuit 124.

For example, communication including a state notification that represents a host-side state is performed from the host control unit 130 to the GPS control section 121 through the communication separating circuit 124 at a predetermined interval (for example, an interval of one second). Accordingly, the GPS control section 121 can check the host-side state, and thus the host state monitoring port of the GPS control section 121 can be omitted.

Configuration Example of GPS Module

Figure 17:
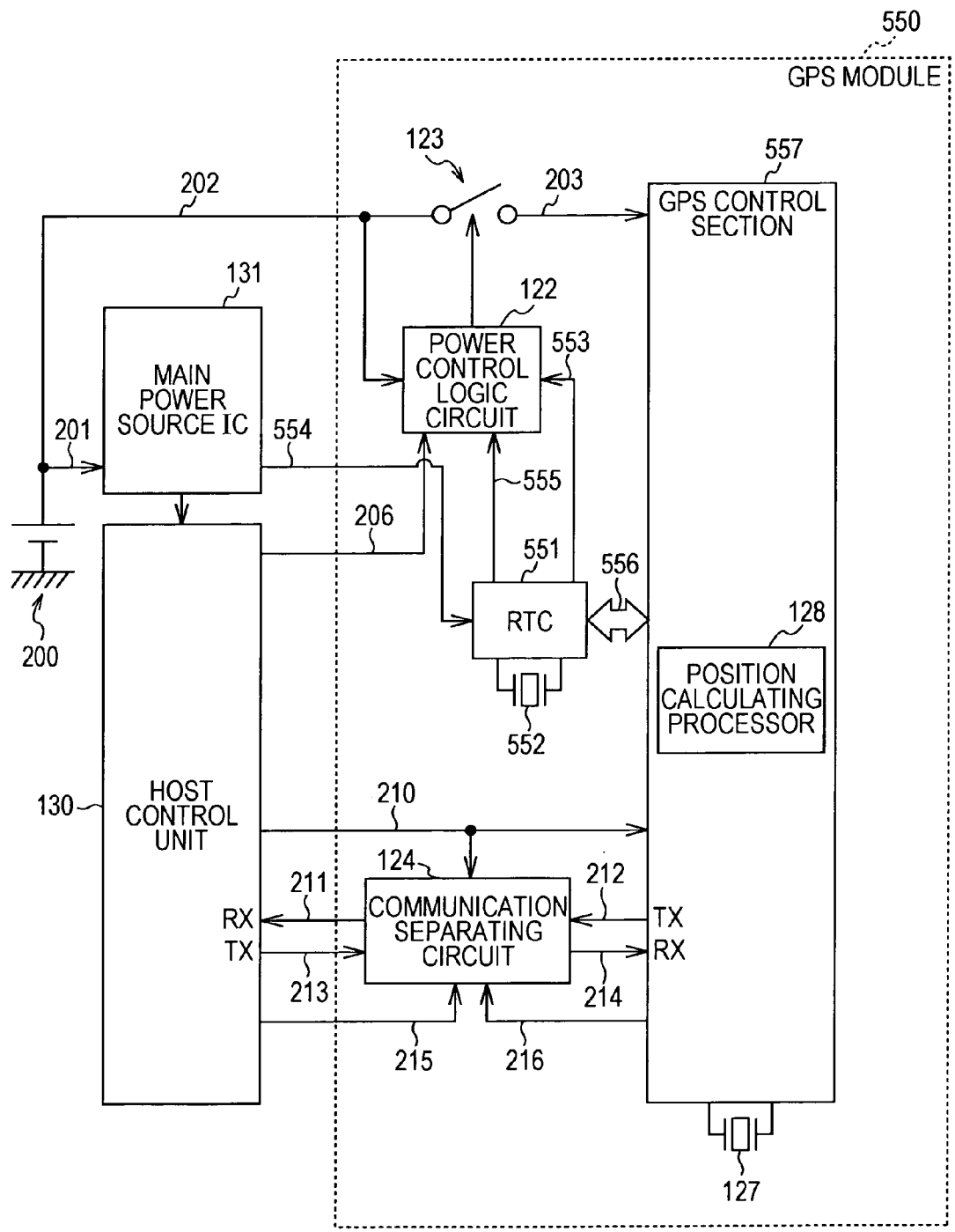
FIG. 17 is a diagram showing an example of the internal configuration of a GPS module according to another modified example of the first embodiment of the present invention.

FIG. 17 is a diagram showing an example of the internal configuration of a GPS module 550 according to another modified example of the first embodiment of the present invention. In the GPS module 550, instead of the RTC 125 that is built in the GPS control section 121 shown in FIG. 3, an RTC 551 is disposed to the outside of the GPS control section 557. In addition, a signal line 553 corresponds to the signal line 204, a power supply line 554 corresponds to the power supply line 205, and a signal line 555 corresponds to the signal line 207. In the RTC 551, an oscillator 552 is disposed, and a communication line 556 used for various communications between the GPS control section 557 and the RTC 551 is disposed.

As above, the RTC may be disposed outside the GPS control section 557. In addition, instead of the RTC, another time counting circuit that can manage time may be used.

Configuration Example of GPS Module

Figure 18:
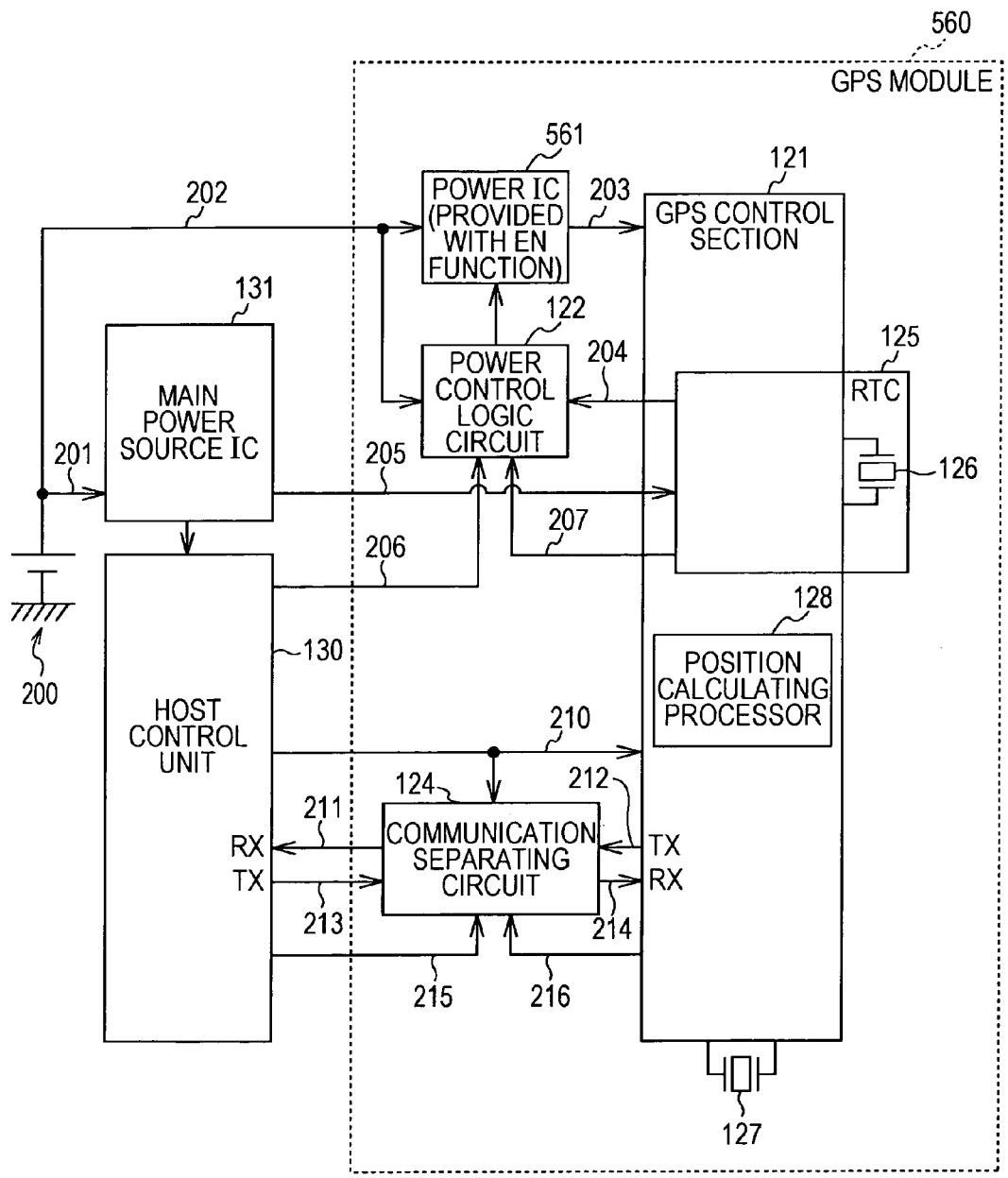
FIG. 18 is a diagram showing an example of the internal configuration of a GPS module according to another modified example of the first embodiment of the present invention.

FIG. 18 is a diagram showing an example of the internal configuration of a GPS module 560 according to another modified example of the first embodiment of the present invention. In the GPS module 560, instead of the power switch 123 shown in FIG. 3, a power source IC 561 is disposed. The power source IC 561 is a power source circuit having an EN (enable) function and switches between ON/OFF of the supply of power from the battery 200 to the GPS module 120 under the control of the power control logic circuit 122. The power source IC 561 is configured by a DC/DC converter, an LDO (Low Drop Out Regulator), or the like. In a case where the DC/DC converter is used as the power source IC 561, it is preferable that an appropriate DC/DC converter among a voltage-dropping type, a voltage-raising type, and a voltage raising/dropping type is used in accordance with the operating assurance voltage range of the GPS control section 121. Accordingly, it may not be necessary to monitor the voltage of the battery 200. On the other hand, in a case where the LDO is used as the power source IC 561, it is necessary to monitor the voltage of the battery 200 in a case where the voltage range of the battery 200 is lower than the LDO output voltage that is selected in accordance with the operating assurance voltage range of the GPS control section 121. Here, the power source IC 561 is an example of a switching unit according to an embodiment of the invention.

As above, ON/OFF of the supply of power from the battery 200 to the GPS module 120 may be switched by using a power source circuit other than the power switch. In addition, instead of the power source IC 561, a power source block that is configured by a plurality of circuits may be used. As this power source block, a block in which each power source port can be controlled by an external front controller may be used. In such a case, for example, the same configuration as that of the host control unit may be used.

Configuration Example of GPS Module

Figure 19:
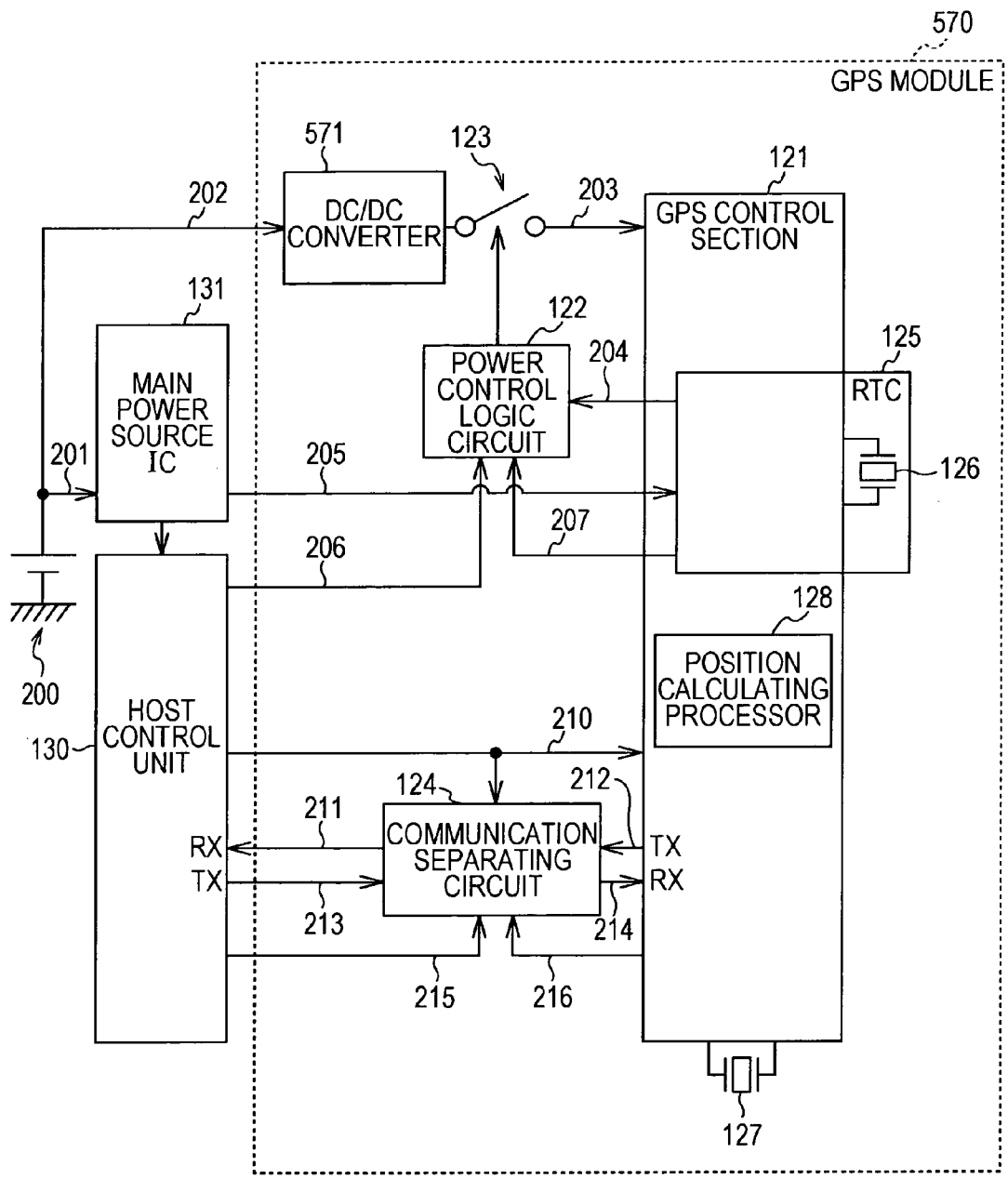
FIG. 19 is a diagram showing an example of the internal configuration of a GPS module according to another modified example of the first embodiment of the present invention.

FIG. 19 is a diagram showing an example of the internal configuration of a GPS module 570 according to another modified example of the first embodiment of the present invention. In the GPS module 570, between the battery 200 and the power switch 123 shown in FIG. 3, a DC/DC converter 571 is disposed.

As the DC/DC converter 571, it is preferable that an appropriate DC/DC converter among a voltage-dropping type, a voltage-raising type, and a voltage raising/dropping type is used in accordance with the operating assurance voltage range of the GPS control section 121. By disposing the DC/DC converter between the battery 200 and the power switch 123, it may not be necessary to monitor the voltage.

Configuration Example of GPS Module

Figure 20:
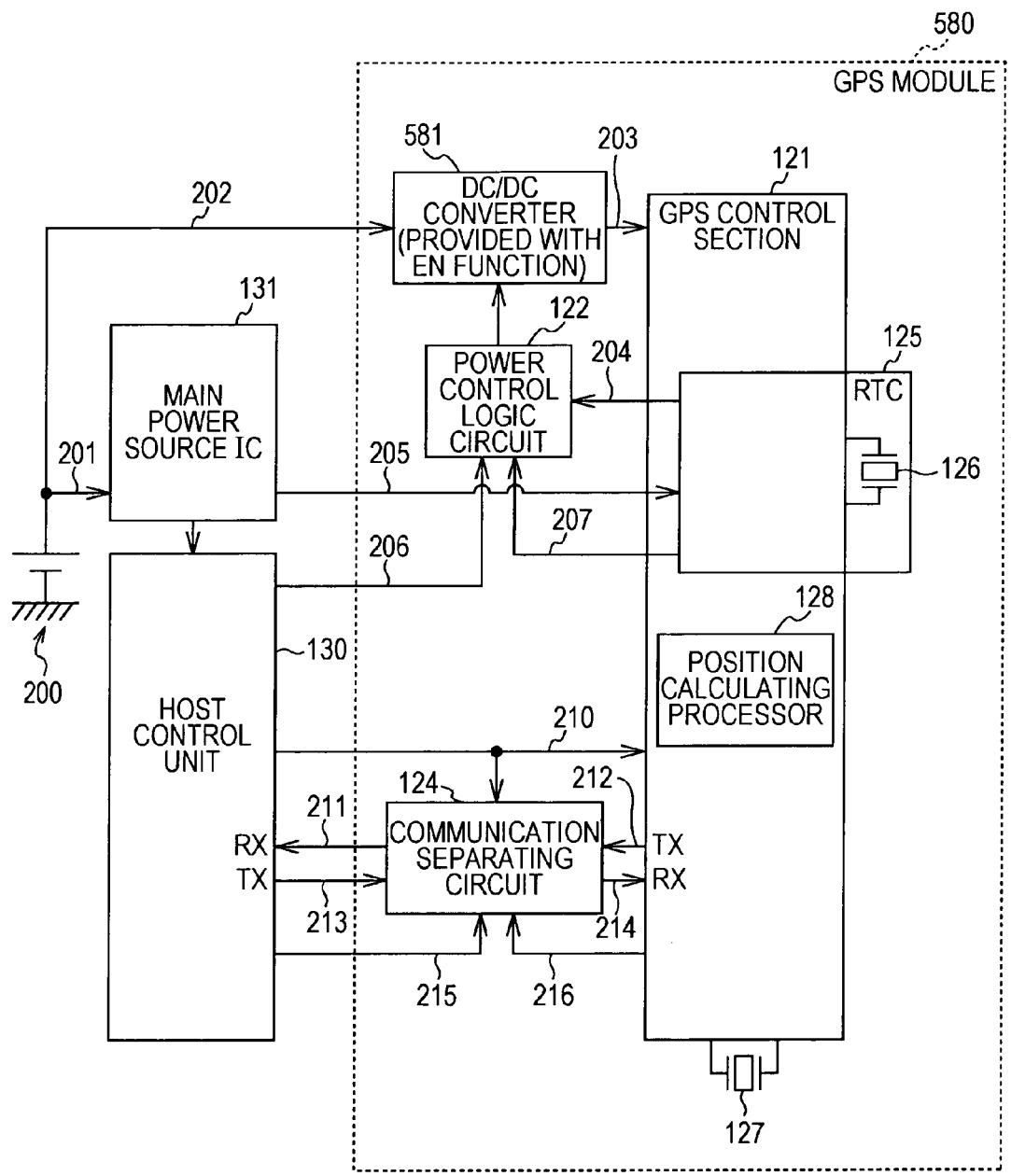
FIG. 20 is a diagram showing an example of the internal configuration of a GPS module according to another modified example of the first embodiment of the present invention.

FIG. 20 is a diagram showing an example of the internal configuration of a GPS module 580 according to another modified example of the first embodiment of the present invention. In the GPS module 580, instead of the power switch 123 shown in FIG. 3, a DC/DC converter 581 is disposed. As the DC/DC converter 581, it is preferable that an appropriate DC/DC converter among a voltage-dropping type, a voltage-raising type, and a voltage raising/dropping type is used in accordance with the battery 200 and the operating assurance voltage range of the GPS control section 121. The DC/DC converter 581 is a power source circuit having an EN function and switches ON/OFF of the supply of power from the battery 200 to the GPS module 120 under the control of the power control logic circuit 122. Here, the DC/DC converter 581 is an example of the switching unit according to an embodiment of the present invention.

As above, ON/OFF of the supply of power from the battery 200 to the GPS module 120 may be switched by using a power source circuit other than the power switch. In addition, instead of the DC/DC converter 581, an LDO may be disposed. However, in such a case, it may be necessary to monitor the voltage depending on the relationship between the voltage range of the battery 200 and the operating assurance voltage range of the GPS control section 121.

In addition, in the embodiments of the present invention, a case where the GPS system is used as the positioning unit has been described as an example. However, an embodiment of the present invention may be applied to another positioning system that uses a wireless communication unit. For example, an embodiment of the present invention may be applied to a positioning system that derives positional information using access point information according to a WLAN (Wireless Local Area Network) that exists nearby.

In addition, in the embodiments of the present invention, an example in which the ephemeris data is acquired by the GPS antenna of the GPS module has been described as an example. However, the present invention is not limited thereto. Thus, the ephemeris data may be acquired by using another reception method. For example, ephemeris data stored in a server may be received and acquired by a communication unit (a wireless communication unit or a wired communication unit) through a predetermined network. In this case, for example, the communication unit may be disposed inside the GPS module. Here, the communication unit is an example of a reception unit according to an embodiment of the present invention. In a case where the ephemeris data is acquired by using the communication unit, an operation in the middle of the acquisition process may be set as the predetermined operation.

In addition, an embodiment of the present invention can be applied to an electronic apparatus (for example, a cellular phone provided with an imaging function, a navigation system, a portable media player) including a positioning unit or an electronic apparatus controlling the positioning unit. For example, in a case where an embodiment of the present invention is applied to a cellular phone provided with an imaging function that includes a positioning unit, the predetermined process using the positioning information is set as the photographing mode, and processes other than the predetermined process may be set as a communication mode, a content reproducing mode, and the like.

The embodiments of the present invention show examples for implementing the present invention. Thus, as is clearly specified in the embodiments of the present invention, an item in the above-described embodiments of the present invention and an item specifying an embodiment of the present invention have correspondence relationship. Similarly, an item specifying an embodiment of the present invention and an item to which the same name is assigned in the above-described embodiments of the present invention have correspondence relationship. However, the present invention is not limited to the embodiments, and may be embodied by applying various changes to the embodiments in the scope not departing from the concept of the present invention.

In addition, the processing sequence described in the embodiments of the present invention may be perceived as a method having a series of such a sequence, and may be perceived as a program allowing a computer to perform such the series of such a sequence or a recording medium having the program stored thereon. As the recording medium, for example, a CD (Compact Disc), an MD (MiniDisc), a DVD (Digital Versatile Disk), a memory card, a Blu-ray Disc (registered trademark), and the like can be used.

The present application contains subject matter related to that disclosed in Japanese Priority Patent Application JP 2010-000842 filed in the Japan Patent Office on Jan. 6, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus, comprising:
a reception unit configured to acquire position information from a global positioning system;
a determination unit configured to determine whether a process identified by an operation input utilizes the position information; and
a controller that controls a supply of power to the reception unit based on determining whether the process utilizes the position information,
wherein when the process is determined to not utilize the position information, the controller is configured to:
control operation of the reception unit according to a first mode until a predetermined operation is completed, and control the operation of the reception unit after completion of the predetermined operation according to a second mode having a lower power consumption than a power consumption of the first mode; and
wherein the first mode is a satellite capture mode, the second mode is a position update mode, and the predetermined operation is a satellite capturing operation.

2. The electronic apparatus according to claim 1, wherein the controller is configured to control operation of the reception unit when the process is determined to utilize the position information, and wherein the controller is configured to stop the operation of the reception unit based on an operation mode of the global positioning system and when the process is determined to not utilize the position information.

3. The electronic apparatus according to claim 1, wherein when the process is determined to not utilize the position information, the controller is configured to:
control operation of the reception unit until the predetermined operation is completed, and
stop the operation of the reception unit after the predetermined operation is completed.

4. The electronic apparatus according to claim 1, wherein the reception unit includes the global positioning system that acquires the position information, and wherein the position information is one of: ephemeris data and global positioning system satellite information.

5. The electronic apparatus according to claim 4, wherein the reception unit acquires the position information based on:
the satellite capture mode in which the global positioning system satellite information is captured by the reception unit intermittently at a predetermined interval, and
the position update mode in which the position information is intermittently updated at the predetermined interval.

6. The electronic apparatus according to claim 1, wherein the controller is configured to control the operation of the reception unit according to a third mode.

7. The electronic apparatus according to claim 1, further comprising: an imaging unit that generates image data by imaging a subject, wherein the reception unit is configured to calculate positional information based on the position information at a time of imaging the subject.

8. The electronic apparatus according to claim 7, further comprising: an operation reception unit configured to receive a switching operation that indicates a switching from a photographing mode to another mode.

9. The electronic apparatus according to claim 1, further comprising: an operation reception unit that receives a power-off operation that turns power of the electronic apparatus off as the operation input, wherein the determination unit determines that the process does not utilize the position information when the power-off operation is received as the operation input.

10. The electronic apparatus according to claim 1, further comprising:
a power supply unit that supplies a main power to the reception unit through a power supply line; and
at least one of a first switching unit that switches between ON/OFF of the power supply line and a second switching unit that switches between ON/Standby in accordance with a control signal line, wherein the controller is configured to control an operation of the reception unit by controlling the first switching unit or the second switching unit.

11. The electronic apparatus according to claim 1, wherein the determination unit determines that the process does not utilize the position information when an operation state of the electronic apparatus is a standby state.

12. The electronic apparatus according to claim 1, wherein the supply of power to the global positioning system (GPS) is controlled based on an operation mode of the global positioning system, wherein the operation mode comprises a GPS OFF mode in which no power is supplied to the reception unit even when the determination unit determines that the process utilizes the position information.

13. A positioning device comprising:
a reception unit configured to acquire position information from a global positioning system;
an acquisition unit configured to acquire predetermined information representing whether a process identified by an operation input utilizes the position information; and
a controller that controls a supply of power to the reception unit based on determining whether the process utilizes the position information, wherein when the process is determined to not utilize the position information, the controller is configured to control an operation of the reception unit according to a first mode until a predetermined operation is completed, and control the operation of the reception unit after completion of the predetermined operation according to a second mode having a lower power consumption than a power consumption of the first mode; and wherein the first mode is a satellite capture mode, the second mode is a position update mode, and the predetermined operation is a satellite capturing operation.

14. A method of processing information, comprising:

in an electronic apparatus:

acquiring by a reception unit of the electronic apparatus, position information from a global positioning system;

determining whether a process identified by an operation input utilizes the position information; and controlling a supply of power to the reception unit based on determining whether the process utilizes the position information, wherein when the process is determined to not utilize the position information, controlling operation of the reception unit according to a first mode until a predetermined operation is completed, and controlling the operation of the reception unit after completion of the predetermined operation according to a second mode having a lower power consumption than a power consumption of the first mode; and wherein the first mode is a satellite capture mode, the second mode is a position update mode, and the predetermined operation is a satellite capturing operation.

15. A non-transitory computer readable medium storing instructions that when executed by a processor cause the processor to perform steps comprising:

acquiring by a reception unit of an electronic apparatus, position information from a global positioning system;

determining whether a process identified by an operation input utilizes the position information; and controlling a supply of power to the reception unit based on determining whether the process utilizes the position information, wherein when the process is determined to not utilize the position information, controlling operation of the reception unit according to a first mode until a predetermined operation is completed, and controlling the operation of the reception unit after completion of the predetermined operation according to a second mode having a lower power consumption than a power consumption of the first mode; and wherein the first mode is a satellite capture mode, the second mode is a position update mode, and the predetermined operation is a satellite capturing operation.

16. An electronic apparatus, comprising:

a reception unit configured to acquire position information from a source external to the electronic apparatus;

a determination unit configured to determine whether a process identified by an operation input utilizes the position information; and a controller that controls a supply of power to the reception unit based on determining whether the process utilizes the position information and a power logic of the reception unit, wherein the reception unit comprises a global positioning system that acquires the position information, wherein the position information is at least one of ephemeris data and global positioning system satellite information, wherein the reception unit acquires position information based on: a satellite capture mode in which the global positioning system satellite information is captured by the reception unit intermittently at a predetermined interval, and a position update mode in which the position information is intermittently updated at the predetermined interval, wherein when the process is determined to not utilize the position information, the controller is configured to: control an operation of the reception unit according to a first mode until a predetermined operation is completed, and control the operation of the reception unit after completion of the predetermined operation according to a second mode having a lower power consumption than a power consumption of the first mode, and wherein the first mode is the satellite capture mode, the second mode is the position update mode, and the predetermined operation is a satellite capturing operation.

* * * * *